United States Patent [19]

Perry, Jr. et al.

[11] Patent Number: 4,883,823

[45] Date of Patent: Nov. 28, 1989

[54] SELF-CONTAINED RENEWABLE ENERGY SYSTEM

[75] Inventors: John H. Perry, Jr., Jupiter, Fla.; Bharat K. Bhatt, Fullerton, Calif.; Jesse Capps, Santa Ana, Calif.; Paul M. Eldridge, Jupiter, Fla.; Leonard Greiner, Sorda Ana, Calif.; Robert W. Lockyer, Jupiter, Fla.; Michelle Martin, Atlanta, Ga.; Raymond R. McNeice, Lake Park, Fla.; Steven M. Misiaszek, Lake Park, Fla.; Stanton S. Perry, Dana Point, Calif.; Thomas F. Sullivan, Lake Worth, Fla.; Paul G. Campbell, North Palm Beach, Fla.

[73] Assignee: Perry Oceanographics, Inc., Riviera Beach, Fla.

[21] Appl. No.: 184,474

[22] Filed: Apr. 21, 1988

Related U.S. Application Data

[62] Division of Ser. No. 931,464, Nov. 14, 1986, Pat. No. 4,776,171.

[51] Int. Cl.$^4$ .................... C07O 27/06; C07L 31/04
[52] U.S. Cl. ................................. 518/702; 518/713
[58] Field of Search ............................. 518/702, 713

[56] References Cited

PUBLICATIONS

Steinberg, Fuel, 1978, vol. 57, pp. 460–468.

Primary Examiner—Howard T. Mars
Attorney, Agent, or Firm—Paul J. Sutton; Barry G. Magidoff; Anthony Amaral, Jr.

[57] ABSTRACT

An integrated power system is located adjacent a body of saline water. The power system includes a solar powered and a wind driven engine. Desalinization and electrolysis of the water is provided. The system produces carbon dioxide and hydrogen which are used to generate methanol. The methanol can be used as a fuel to drive a combustion engine.

6 Claims, 23 Drawing Sheets

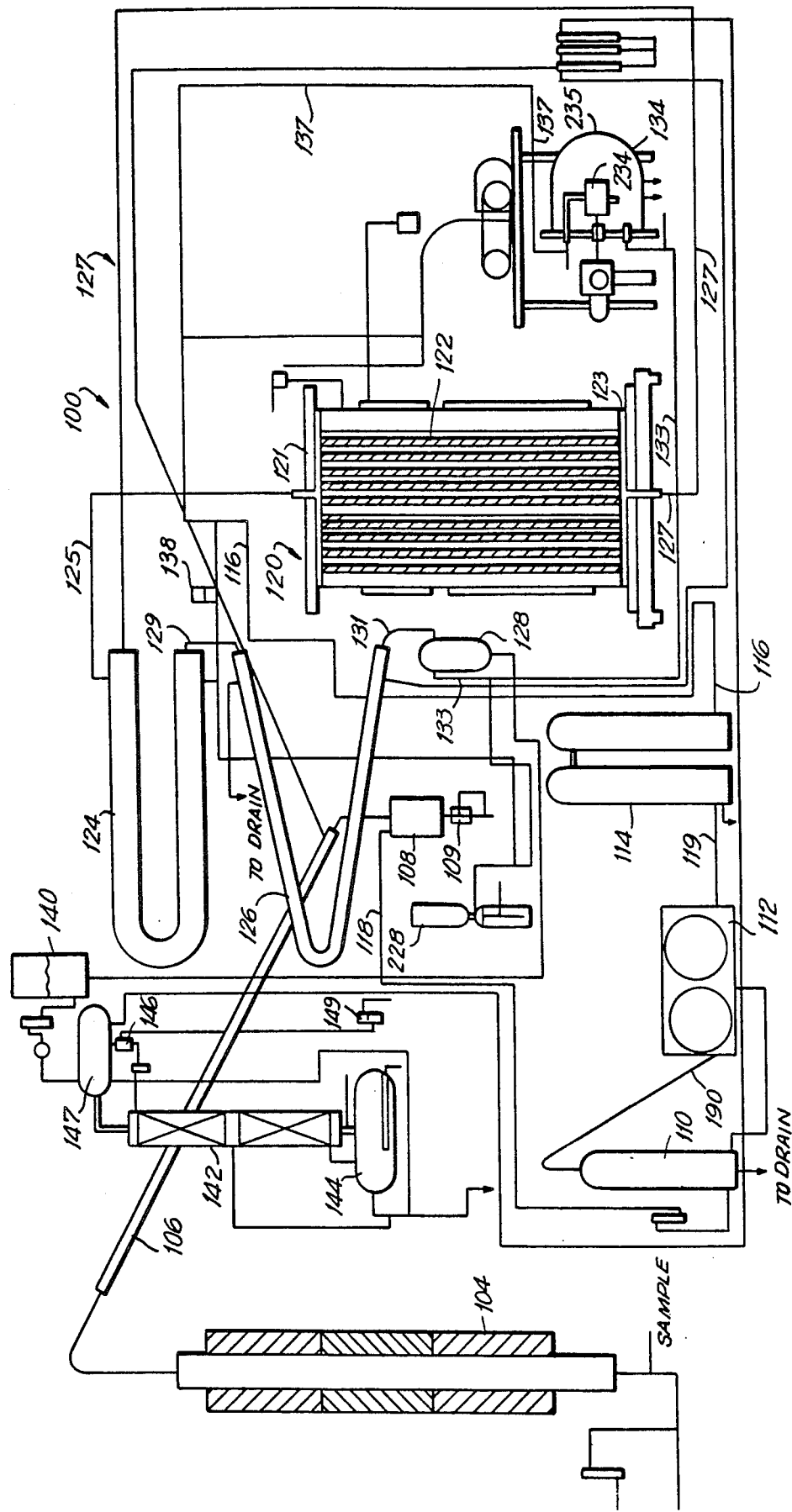

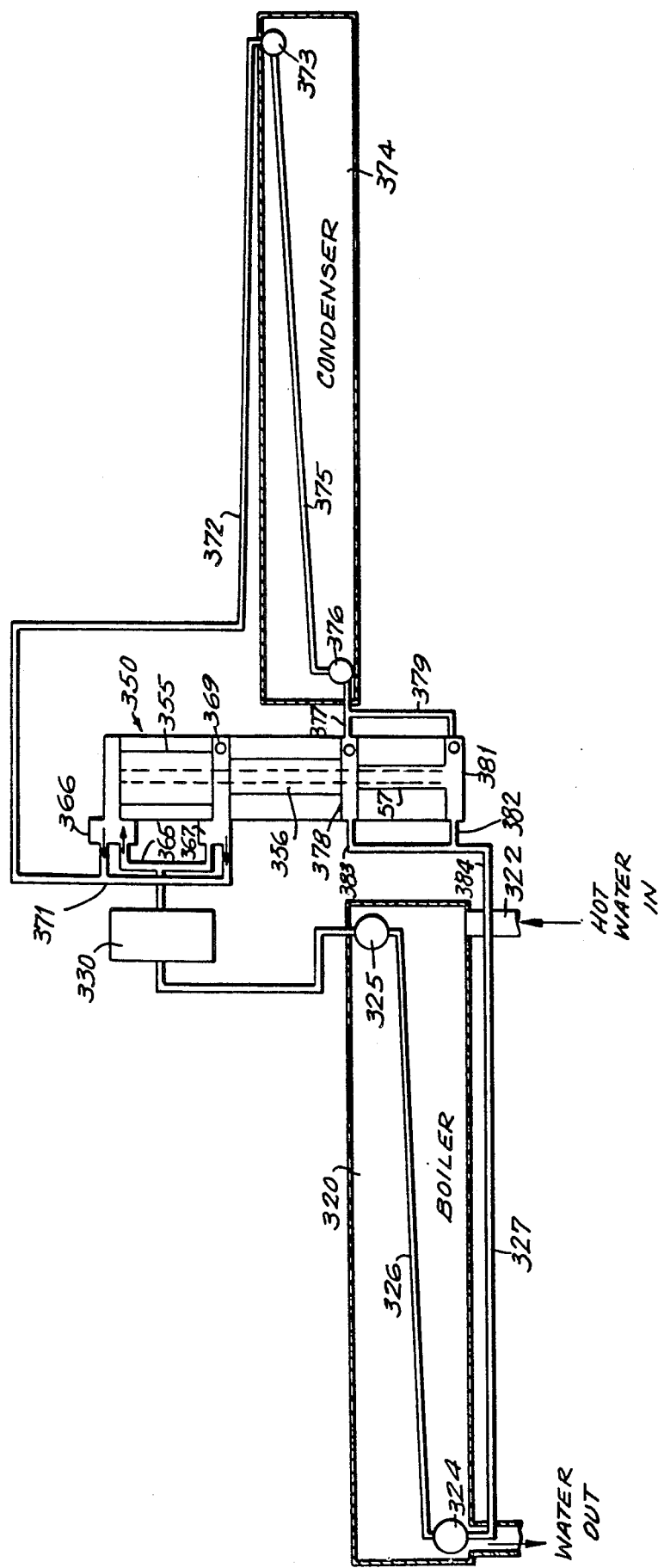

FIG. 10A
FIG. 10B
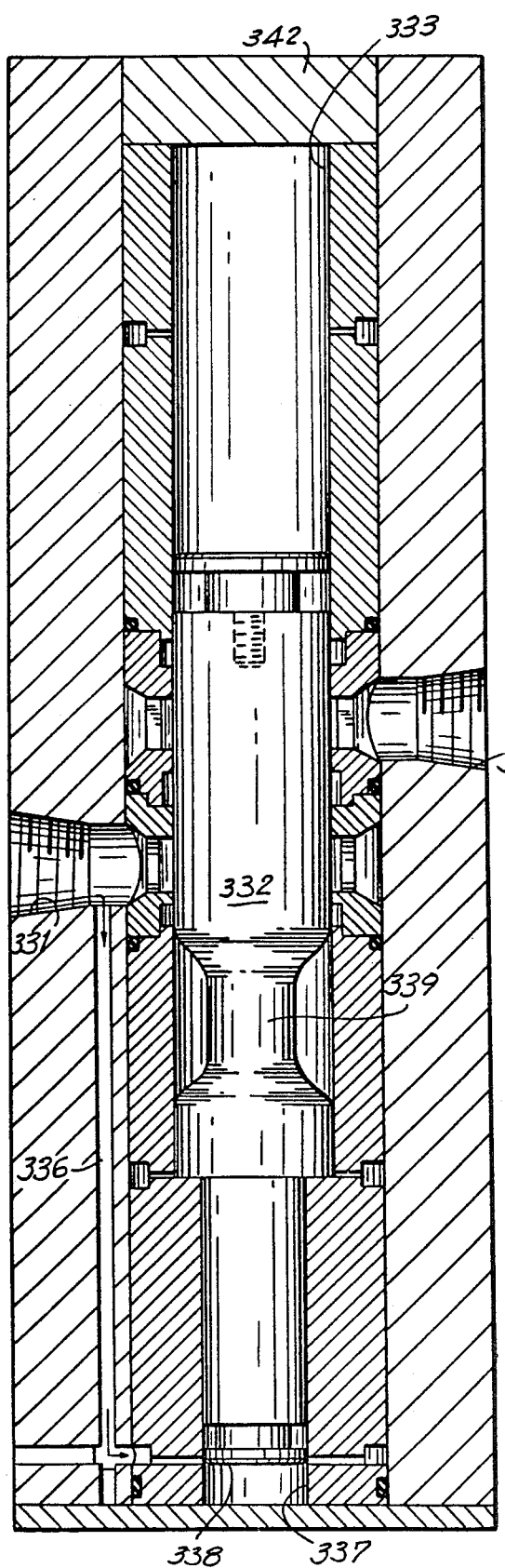
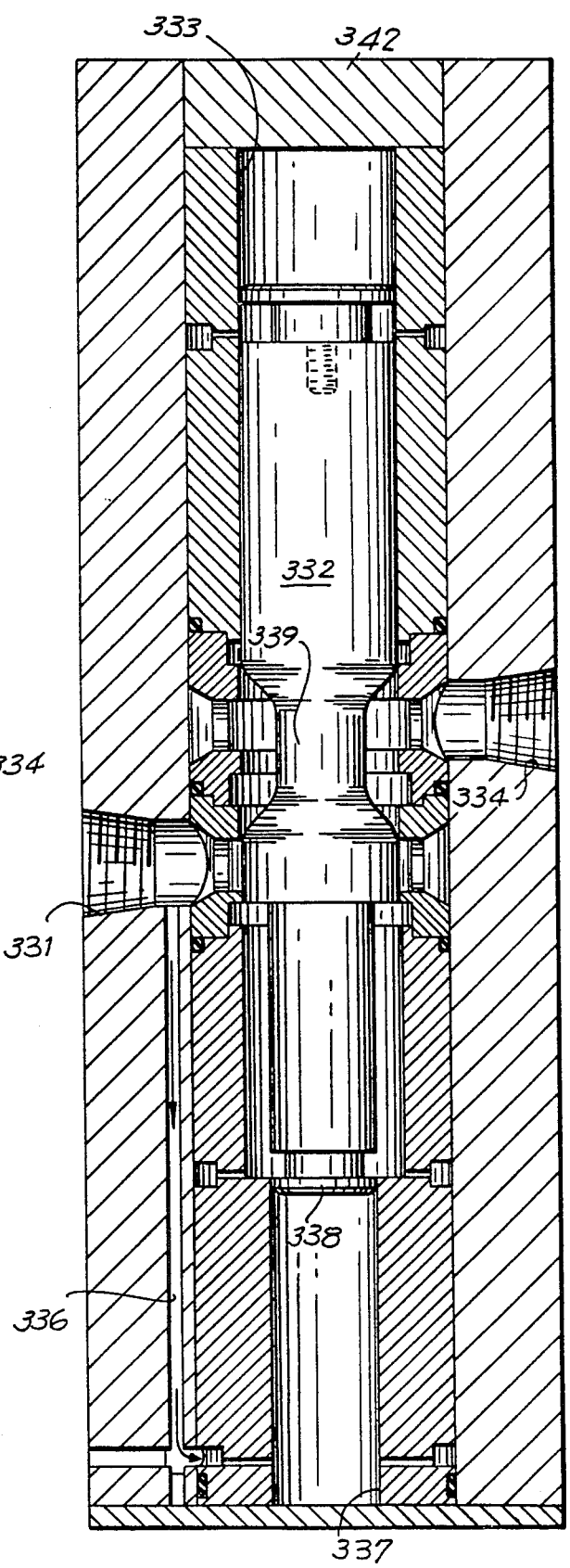

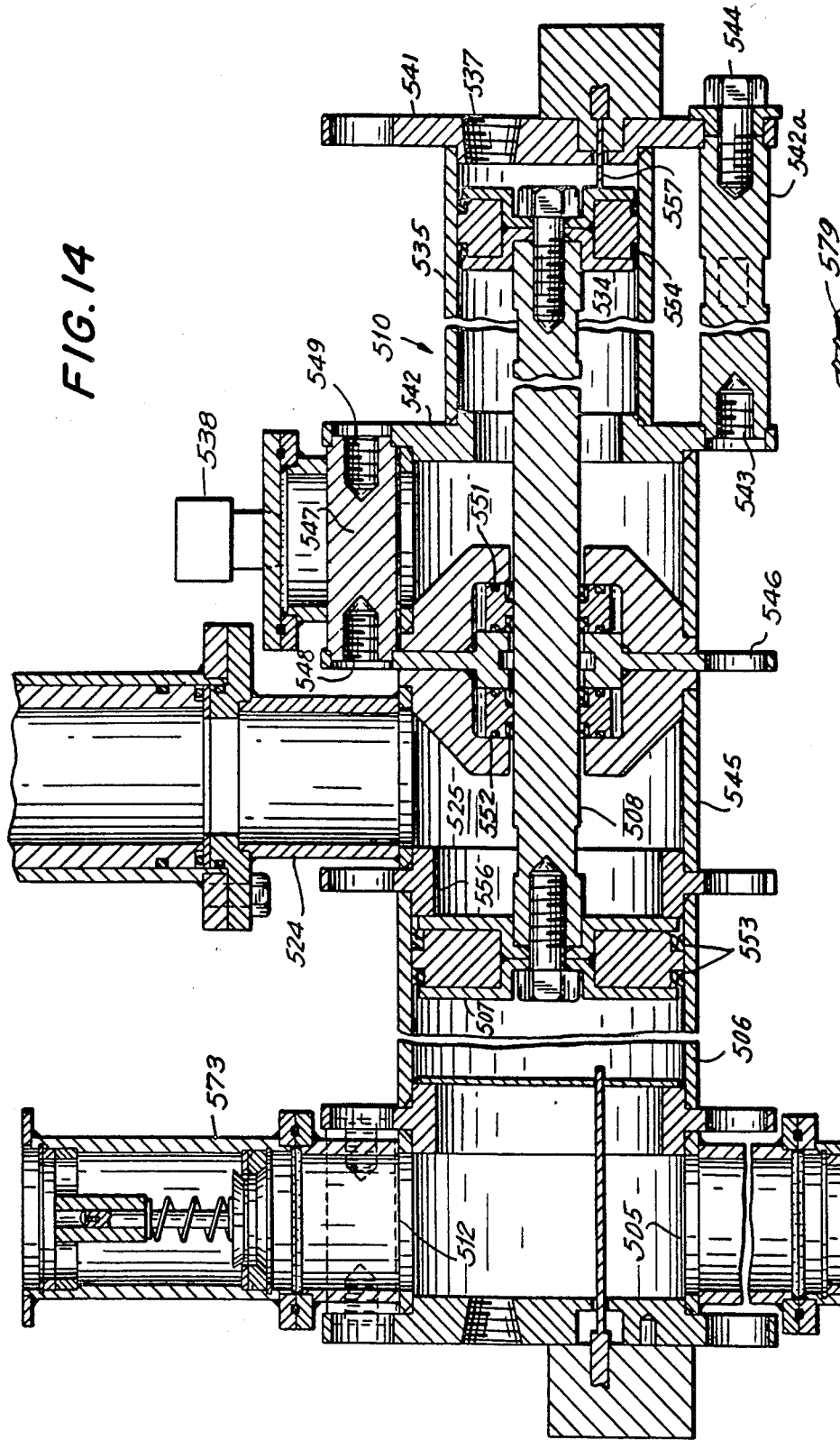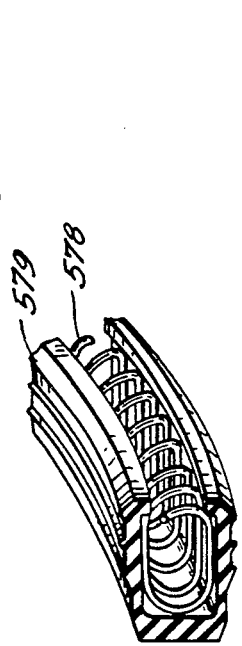

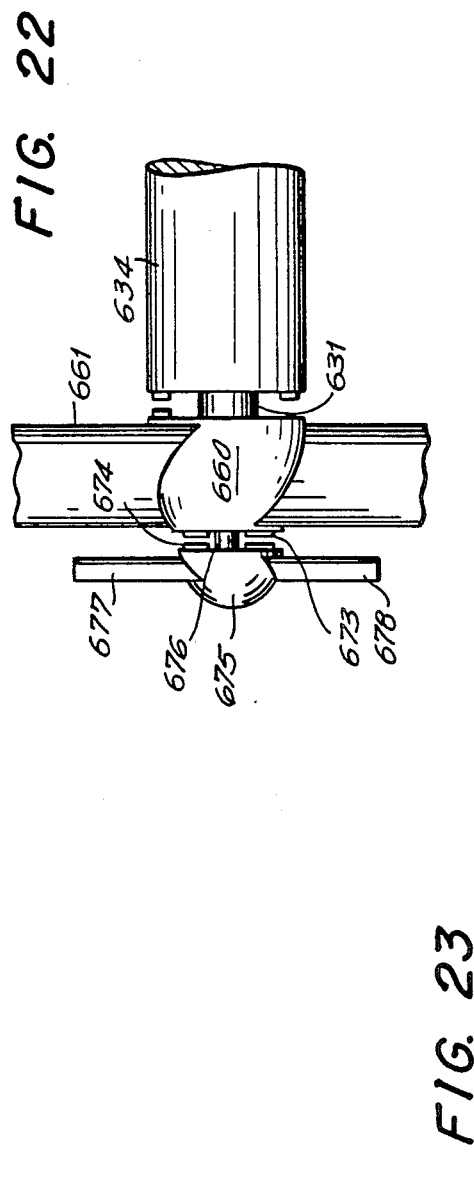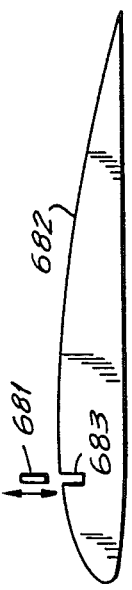

FIG. 25
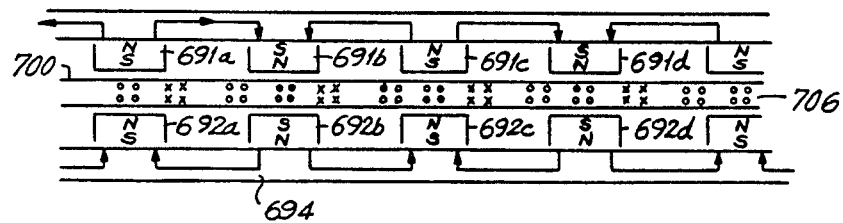
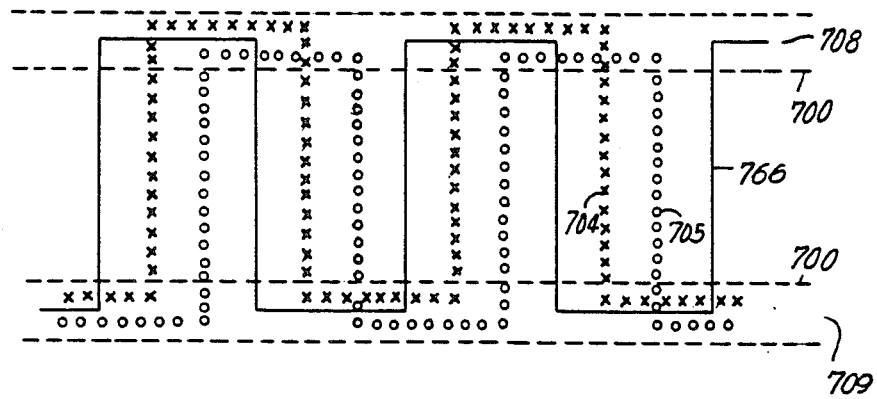
FIG. 26
FIG. 27
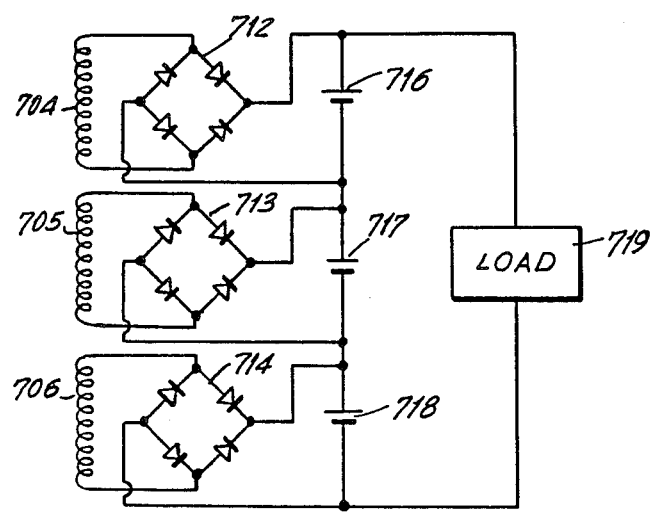

SELF-CONTAINED RENEWABLE ENERGY SYSTEM

This is a division of application Ser. No. 931,464 filed Nov. 14, 1986, now U.S. Pat. No. 4,776,171.

It is well known that the energy needs of the industrially developed countries are supplied primarily by fossil fuels such as petroleum, coal, and natural gas, or by fissionable materials. It is also well known that the industrially developed countries use more energy per capita then the less developed countries. It is therefore to be expected that, as the less developed countries become industrially developed, the worldwide rate of energy use will increase. This in the face of known fact that, for all practical purposes, global supplies of fossil fuels, as well as nuclear fuels, are necessarily limited. It takes natural processes millions of years to create the coal and oil that is consumed in just a few short decades at current levels of global energy use.

Because global supplies of fossil fuels are necessarily limited, it is recognized by those skilled in the art that, in the long term, the energy needs of industrially developed civilization will have to be met by renewable energy resources such as solar power, wind, hydro power or geothermal power. At present, power from renewable energy resources is used for specialized purposes at locations remote from a power grid. For example, solar power may be used to operate communication equipment or small water pumps at remote locations. A disadvantage is that solar power is lost at night or reduced by cloud cover. Similarly, availability of wind power is subject to the presence of wind in excess of the minimum velocity required to operate the equipment. These inevitable variations in power level and interruptions in power supply made solar power, and wind power, undesirable as the principal power source for an industrially developed community.

Previously the solution to the problems created by extreme variations or interruptions in the renewable energy sources, the sun, wind, has been to tie these renewable energy sources into a power grid so that during periods when insufficient power is available from the renewable sources, the deficiencies can be made up by conventional electrical power generation plants burning fossil fuels.

It is also known to desalinate ocean water and to generate hydrogen from salt-free water by electrolysis, i.e., utilizing electrical energy. It is also well known to produce methanol using hydrogen and an oxide of carbon, i.e., carbon monoxide or carbon dioxide. These prior methanol preparation reactions utilized generally a catalyst, elevated temperatures and elevated pressures to form the methanol product. Prior methanol preparation processes used catalysts formed from the oxides of zinc, chrome, manganese or aluminum. More recently, catalysts of the oxides of copper and nickel have been proposed. The copper and nickel catalysts generally require lower pressurization of the hydrogen and carbon oxide reagents.

In a completely unrelated field, it is also known to pass limestone, or calcium carbonate, through a kiln to form quicklime, CaO, and carbon dioxide. The same reaction occurs with other oxides of, especially, the alkaline earth metals, e.g., magnesium carbonate. Similarly it is known that the reverse action occurs, in which certain oxides or hydroxides, such as calcium oxide and calcium hydroxide, barium oxide and barium hydroxide, lead oxide, and bismouth oxide, spontaneously absorb carbon dioxide from the air or from water (such as seawater) containing carbon dioxide to form respective carbonates.

It is an object of the present invention to provide an energy generation and management system which combines the exploitation of two or more renewable energy sources with two or more forms of energy storage and suitable control and distribution means to supply the full range of needs of an industrially developed community. It is a further object of the present invention to provide an energy generation and management system to exploit a combination of solar power, wind power, and tidal power, to provide, e.g., electric power over a very wide range of natural conditions. It is yet another object of this invention to provide two or more energy storage media for storing excess energy during periods of excess power availability from one or more of the renewable energy sources, such that energy is stored in electric storage batteries or in the form of a liquid fuel that can be used to generate power when community needs cannot be met by any of the renewable sources or storage batteries, or to power combustion engines.

It is an object of this invention to provide a means to store as potential energy the power provided from natural renewable processes to enable a continuing utilization of that energy in a practical and efficient manner. It is a further object of this invention to produce an efficient and clean-burning fuel for driving internal combustion engines.

It is an object of this invention to provide a means to store the potential energy provided by natural renewable processes to enable a continuing utilization of that energy in a practical and efficient manner, and to desalinate sea water to provide salt-free water for that purpose. It is a further object of this invention to provide a variety of products from such a process having utility in fields other than energy usage. It is a further object of this invention to produce an efficient and clean-burning fuel for driving internal combustion engines.

It is a further object of this invention to provide a high capacity solar powered pump, which is simple to operate and easily maintained, and which has a long useful life.

Yet further object of this invention is to provide means to maximize the power obtained from the wind over the course of a year at a particular location, based upon the usual wind velocities found at each such location.

Yet another object of the present invention is to distribute power from each renewable resource to each end use or to a reservoir for potential energy in the most direct and efficient manner, including using electrical and hydraulic or pneumatic power distribution systems.

In accordance with the present invention, it has now been discovered that an integrated process utilizing previously unrelated steps can be carried out in order to provide a means of storing, and thereby maintaining a constant flow of energy from, an intermittent renewable energy source such as the natural flow of wind, or the passage of sunlight during the daylight hours.

The present invention system meets these objectives by providing tapping means for exploiting a combination of mutually re-enforcing naturally renewable energy sources with an energy generation and management system which links the tapping means together and which links the tapping means to energy reservoirs and points of use. For example, solar generated hydraulic power can be hydraulically distributed to suitable hydraulically driven water purification, refrigeration, air conditioning, and water pumping equipment. Wind generated electric power can be transmitted to electric storage batteries, electric power tools, illumination and communication equipment. In addition, the energy generation and management system of the present invention can include an hydraulically powered electrical generator and an electrically powered hydraulic pump to enable crossover between the two energy distribution systems when needed.

In a preferred embodiment of this invention, an oceanside location, optimally an island in the low latitude, temperate or tropical regions, can provide the necessary climate for achieving the objects of this invention. Referring to FIG. 1, as an example, a near tropical island on which fossil fuels are not available, and would otherwise have to be imported to maintain an industrially developed community, is provided with the combined renewable energy and reservoir system laid out in the block diagram of FIG. 2. The details of the individual elements, or sub-combinations, of this system are also given below.

Preferred examples of certain advantageous embodiments of the processes in accordance with the present invention are set forth in the accompanying drawings, together with preferred embodiments of the specific elements of this invention required to properly carry out this invention.

In the drawings, and in the following verbal text describing the process, the elements of the apparatus and the general features of the procedure are shown and described in relatively simplified and generally symbolic manner. Appropriate structural details and parameters for actual operation are available and known to those skilled in the art with respect to the conventional aspects of the process. Generally, all process vessels and flow conduits, can be of conventional construction and materials suitable for the particular reagents and products to be contained in accordance with the present process, except where expressly set fourth otherwise. Structural details and parameters for actual operation are not set forth in the following general textual description except where they would not be generally known to those skilled in the art, such details are set forth in the specific working examples set forth further below.

BRIEF DESCRIPTION OF THE DRAWINGS

FIG. 3 is a schematic flow diagram of a system for preparing substantially pure methanol from hydrogen and oxides of carbon;

FIG. 9 is a schematic diagram of the subject low heat engine showing features of the boiler, condenser and engine structure;

FIG. 10A is a cross-sectional view of the start-stop control valve of the subject low heat engine shown in the stop position;

FIG. 10B is a cross-sectional view of the start-stop control valve of the subject low heat engine shown in the start position;

FIG. 14 is a cross-section of a preferred embodiment of a hydraulically-driven reverse osmosis apparatus of this invention;

FIG. 16 is a cross-sectional view taken along lines 16—16 of FIG. 15a;

FIG. 17 is a cut-away view of a spring-loaded ring seal useful in the reverse osmosis apparatus of the present invention;

FIG. 22 is a schematic view of the principal structure of the speed control mechanism of the wind generator;

FIG. 23 is a block diagram of an electronic comparator circuit in the propeller hub;

FIG. 24a and 24b are elevation views of alternative forms of spoiler mechanisms for the propeller of this invention;

FIG. 25 is a diagrammatic sketch of the arrangement of the magnetic view of an electric generator as that in FIG. 21;

FIG. 26 is a diagrammatic cross-section view of the stator ring in the electric generator, of FIG. 21; and FIG. 27 is a circuit diagram of rectifier circuits and in accordance with the present invention.

Referring now to FIGS. 1 and 2 of the drawings, a solar collector 1 supplies heat to a low heat engine 2 (described more fully below), which drives an hydraulic pump 3. Suitable solar heat collectors are well known in the art.

Figure 1:
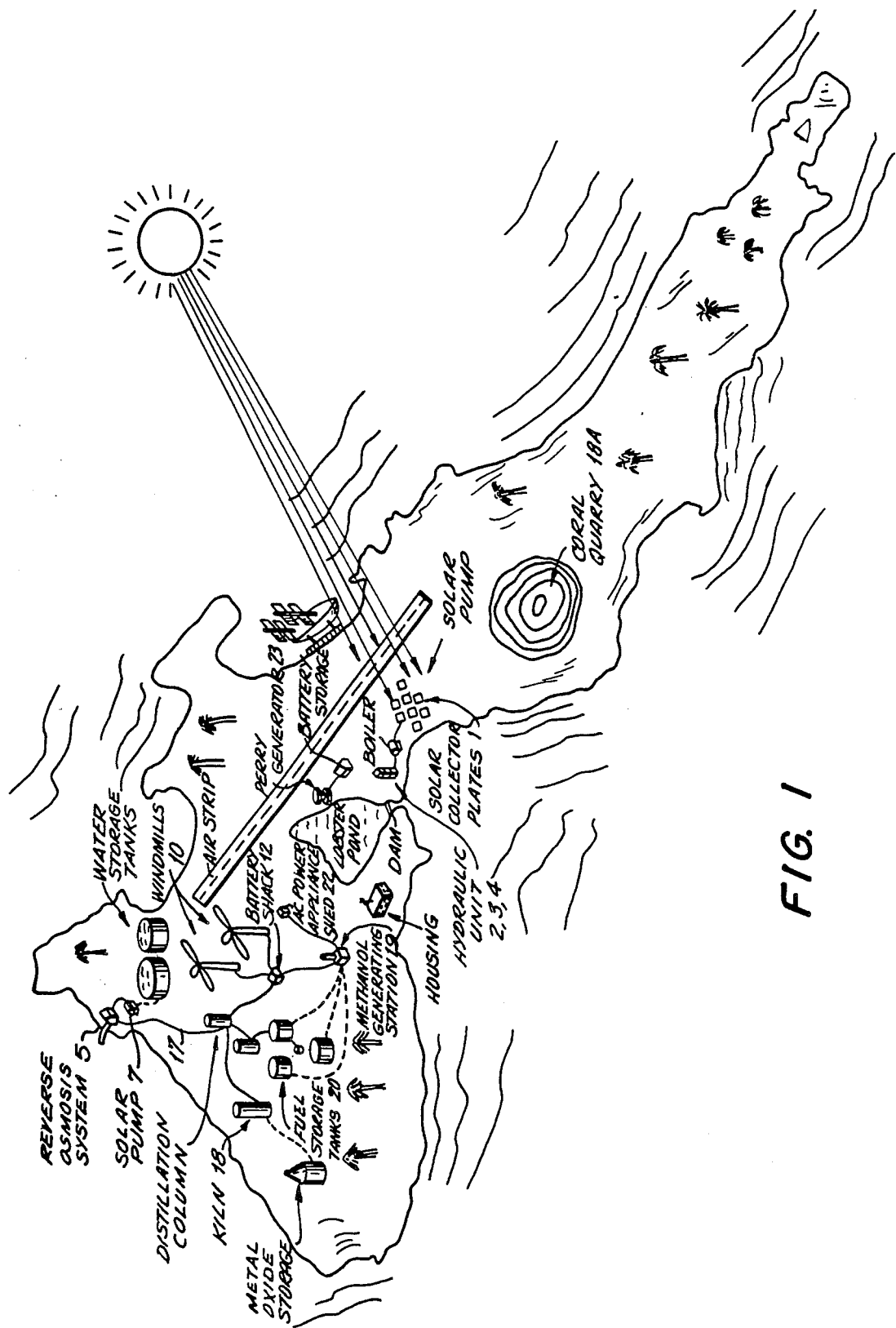
FIGS. 1 and 2 are diagrammatic representations of a tropical island providing a self-contained renewable energy system.
Figure 2:
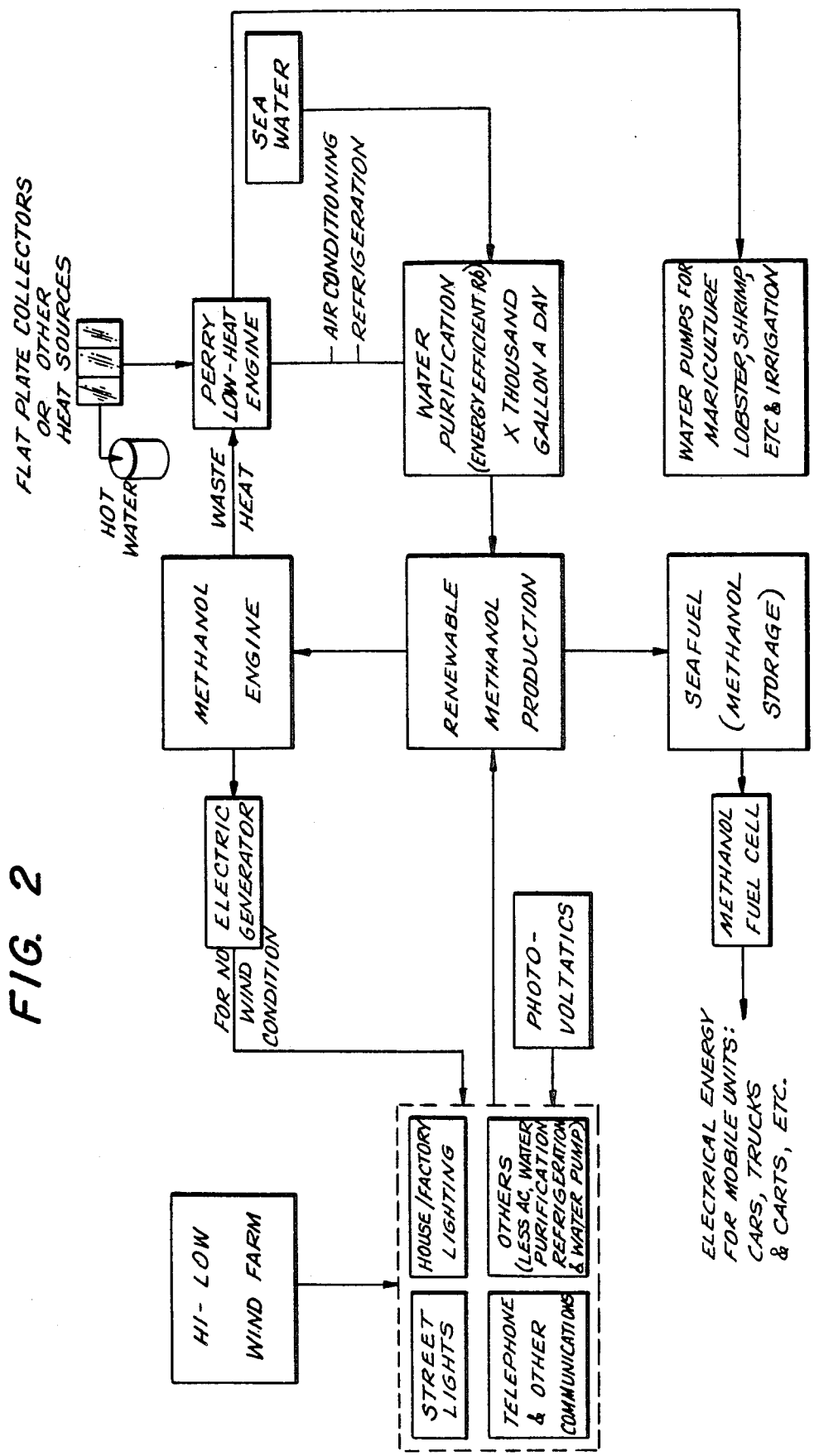

The output from the hydraulic pump 3 may be routed through an hydraulic power distribution control to a reverse osmosis water purifier 5, refrigeration equipment and/or a water pump 7, as the needs of the community require. Electric power from wind generator 10 is directed by electric power distribution control system to storage batteries 12, communications equipment, illumination equipment, or electric power tools as required. Calcium carbonate, e.g., obtained from a coral quarry 18a, or other collection of aquatic shells or sand, is heated in a kiln 18 to form quicklime, for cement, and carbon dioxide. When the demand for the metal oxide is low, or it is not economical to ship to available markets, the metal oxide, e.g. calcium oxide, can be recycled by scavenging carbon dioxide directly from exhaust gases or the air, or from the gas dissolved in e.g., seawater. Fresh water from the reverse osmosis water purifier 5, is electrolyzed using the electric power distributed through the electric power distribution control system, to generate hydrogen, which is in turn reacted with the carbon dioxide from the e.g. quicklime kiln 18 to form methanol in a generating plant 19. The liquid methanol fuel is stored in storage tanks 20.

During periods when there is insufficient wind, or on cloudy days or at night, the stored methanol in the tanks 20 can be used to fuel an e.g., internal combustion engine which drives a high speed electric generator 22; the electric power output of the generator 22 can be routed to the electric power distribution control system. At those times when there is sufficient sun but insufficient wind, hydraulic power can be routed through a hydraulic power distribution system to hydraulic motors, which drive a low speed electric generator, the electric current from which can be supplied to the electric power distribution control system.

POTENTIAL ENERGY STORAGE BY LIQUID FUEL PRODUCTION

One important aspect of the present invention provides a process for the production of methanol from a naturally occurring energy source, water(such as desalinated sea water), and a rock or natural ore containing an alkaline earth carbonate.

More particularly, this aspect of the process preferably comprises the generation of electricity from a renewable source of power such as wind or sunlight, and the electrolysis of pure water to generate elemental hydrogen. A portion of the hydrogen is preferably then combined and burned with air, or other oxygen-containing gas, to heat a kiln, e.g., containing an alkaline earth metal carbonate. The hydrogen and air, or other oxygen-containing gas, is burned to generate a temperature of at least about 1100° F. to pyrolize the carbonate to form the alkaline earth metal oxide and carbon dioxide:

$$MCO_3 \rightarrow MO + CO_2 \quad (I)$$

Another portion of hydrogen is passed into the kiln and mixed with the other gases for an additional time period; a portion of the carbon dioxide and a portion of the hydrogen react to form water and carbon monoxide, by a shift reaction i.e.,

$$CO_2 + H_2 \rightarrow CO + H_2O. \quad (II)$$

Unlike prior commercial kilns, the calcium oxide is not the only product, and the kiln must provide means for collecting the carbon dioxide by-product, as well. In addition, when the hydrogen is generated by an electrolysis system powered by a natural, variable energy source, such as wind, the kiln must be capable of operating at widely varying rates.

This has been most preferably provided for in a specially designed three-section vertical kiln, wherein heat is generated by the burning of hydrogen and oxygen, both obtained from the electrolysis of water. Excess hydrogen is added to be used as the reagent gas, mixed with carbon dioxide for the production of methanol.

Fine particulates of metal carbonate, e.g., calcium carbonate, are fed through an upper pre-heat section of the kiln tube, and fall countercurrently to the upwardly rising hot gases, comprising $H_2$, $CO_2$, $CO$ and water vapor. The metal carbonate particles are thus preheated.

Hydrogen gas is injected through the bottom preheat section of the kiln, where the gas is pre-heated by the hot, downwardly falling metal oxide decomposition products (e.g., calcium oxide). In the central section of the kiln, oxygen gas is injected at several vertical locations and the hydrogen burns to generate heat, to form water vapor, so as to maintain a constant overall elevated temperature in the central section. The oxygen is preferably injected axially from vertical tubes which pass vertically through, preferably, the bottom preheat section.

The overhead flow of hot gases from the kiln is first passed through a closed bin to permit the settling out of very fine solids carried over. Any remaining, very fine particles, are then removed by passing the gas stream through a series of baffles before exhausting the gas to a water wash for final cleaning and removal of most of the water vapor.

The hot gases in the upper preheat and middle burning portions of the kiln tube can also undergo a partial shift reaction, in which a portion of the unburnt hydrogen and a portion of the carbon dioxide gases react to form carbon monoxide and water, if the temperature are sufficiently elevated.

The cleaned gases removed from the kiln are cooled to condense out water and compressed to a pressure of between about 400 and 800 psig, and preferably to at least about 450 psig. The compressed gas to be fed into the reactor preferably contains a major amount of hydrogen, in amounts of at least about 75% by volume, and each of carbon dioxide and carbon monoxide, most preferably in equal proportions, and preferably at least about 1.5% by volume of each. The pressurized gas should be preheated to a temperature of at least about 200° F., and most, preferably up to the reaction temperature, of about 450° F. to about 500° F., before contacting the catalyst.

The compressed and preheated mixture of hydrogen, carbon dioxide and carbon monoxide ("synthesis" or "reactor" gas) is passed into and through the inlet manifold of a multiple tube reactor, wherein each reactor tube is at least partially filled with the desired catalyst, preferably a particulate copper-nickel catalyst. The inlet to each reactor tube from the reactor inlet manifold is precisely machined to insure equal gas flow into and through each of the reactor tubes. Most preferably, the reactor tubes are not more than about seventy-five (75%) percent filled with catalyst, the upstream ends of each tube being empty and serving as a preheat unit. It has been surprisingly found that by pre-heating the reactor gas to the desired reaction temperature of at least about 450° F. and maintaining a pressure of at least about 450 psig, the molar ratio of hydrogen-to-carbon ($CO_2$ plus $CO$) gases need not be greater than 4:1, and can be as low as 3:1. This of course reduces the excess gas flow recycling in the system, increasing efficiency and reducing the required size of the stream.

If sufficient residence time is maintained in the empty portion of the tube, a shift reaction can occur, forming carbon monoxide (CO) from $CO_2$ and $H_2$. This will then reduce the residence time required in the kiln and again improve efficiency, i.e., the product gas from the kiln need not contain the desired minimum proportion of 1.5% by volume of carbon monoxide.

The catalyzed reactions are believed to be the following:

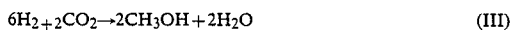

$$6H_2 + 2CO_2 \rightarrow 2CH_3OH + 2H_2O \qquad (III)$$

$$2H_2 + CO \rightarrow CH_3OH \qquad (IV)$$

The effluent from the reactor tubes is then passed through a series of heat exchangers, initially countercurrently, to preheat the incoming synthesis gases, and then through at least one other heat exchanger to finally condense out most of the methanol as a liquid reaction product, i.e., as a solution, with any by-product water. The remaining non-condensed synthesis gases are represented in a recirculating pump, combined with fresh makeup synthesis gas from the initial compressor, and recycled to the reactor.

The recycled reaction gas is maintained at elevated pressure as it is cooled and the methanol condensed out. The recycled gases are incrementally repressurized by a relatively low pressure recycle blower, which is wholly located within the pressurized recycle loop of the system. With the input to the blower at the elevated pressure of the cooled effluent gas, only a relatively small pressure boost is required from the recirculating blower to bring the gases up to the desired reagent pressure, with a relatively small expenditure of energy. Further the blower is exposed only to the relatively small incremental pressure boost, and not to the entire gauge pressure.

When operating the reactor at or near a 3:1 hydrogen-to-carbon-containing gas ratio, the reaction rate unexpectedly can be controlled by modulating the recycle flow rate imparted by the blower. This permits operation of the process over a wide range of kiln gas flow rates, e.g. varying by as much as a factor of four.

The condensed liquid reaction product is distilled to obtain the desired purity of methanol.

It is most preferred that the synthesis reactor gases are maintained at a ratio of hydrogen-to-carbon gases, i.e., $H_2:(CO_2+CO)$ in the range of approximately 3:1 to 5:1. This can be monitored by determining the "average" molecular weight of the synthesis gas mixture, i.e. the combined molecular weights of hydrogen, carbon dioxide and carbon monoxide. Accordingly, means for determining this "average" molecular weight, and thus the relative proportions of the reagents, during operation of the system, are provided. The molecular weights of the synthesis gas, i.e., the combined recycle gas and fresh reagents, entering the reactor, or the recycled exhaust gases from the reactor (after condensation and removal of the condensable vapor) can thus be measured.

The molecular weight determining means for this invention provides for the rapid and accurate measurement of the average molecular weight of a gas mixture by passing a sample of the gas mixture at known pressure and temperature and at sonic velocity through a very accurately machined sonic orifice, i.e., where flow through the orifice is determined only by the upstream gas pressure and temperature. The gas from the orifice passes into a measuring tank and measuring the time to displace a known volume of an inert liquid, e.g. water, in the tank is measured. The minimum pressure ratio across the orifice is about 2:1.

The measuring device is a simple siphon system, comprising an upper and a lower tank sealed apart except for a stand pipe extending from the upper tank to the bottom of the lower tank. The gases enter the lower tank, thereby displacing the liquid therein and forcing it up through the stand pipe to the upper tank.

The time required to displace a given quantity of liquid is measured along with the temperature and pressure of the gas. The "average molecular weight" of the gases can be calculated, and the weight of the gases determined in accordance with the following equations:

By combining the established equations for sonic nozzles and the "perfect gas" equation, a working equation is obtained as follows:

$$M = <(C_p/4)^2 g k R [2/(k+1)]^{(k+1)/k-1)} d^4> (-T_o P_1 t/V_o P_o)^2/T_1.$$

It has been found that for a given system, the angled brackets ($<>$) encompass a constant value ("K"), and it is possible to reduce the equation to:

$$M = K[(T_o P_1 t)/(V_o P_o)]^2/T_1. \qquad (1)$$

and wherein:
W = gas flow, lb./sec
g = acceleration due to gravity, 32.2 ft/sec$^2$.
$P_1$ = pressure in reactor line, lb/in$^2$
$P_o$ = pressure in measurement tank, lb/in$^2$
C = orifice constant (generally about 0.65)
$V_o$ = volume displaced in measurement tank ft$^3$
M = molecular weight, lb/mole
$T_o$ = temperature of gas in measurement tank, °Rankine
$T_1$ = temperature of gas in reactor line, °Rankine
R = gas constant, 1544 ft-lb/mole-°R
A = orifice area, ft$^2$
d = orifice diameter, ft
t = time, to fill volume measured, sec
p = pi, 3.14159
$C_p$ = molar heat capacity at constant pressure,
$C_v$ = molar heat capacity at constant volume,
k = ratio of specific heats, $C_p/C_v$
K = Overall equation constant The value for K has been empirically determined to be about $10^{-10}$. The relative proportions of $H_2$, $CO_2$ and CO can then be determined from the "average molecular weight".

In an alternative system, wherein a shift reaction is carried out, e.g., in a kiln or other reactor external of the catalytic reactor, it is desirable to determine the relative proportions of carbon dioxide and carbon monoxide in the shift reactor effluent. It has surprisingly been found that such an external shift reaction can continuously be monitored by measuring the amount of water in the effluent. Under the shift reaction (Equation II, above), the number of moles of carbon monoxide formed equals the number of moles of $H_2O$ formed. Thus, in order to determine the relative proportions of hydrogen, carbon dioxide and carbon monoxide, the water condensed out of the effluent from the external shift reactor is measured. By also taking into account the vapor pressure of water at the water collection temperature, an accurate measure of the formation of carbon monoxide can be calculated in accordance with the following computations:

$$CO_2(f) + RCO(f) = [CO_2(i) - H_2O(l)](1 - R) \quad (2a)$$

$$-RCO_2(f) + (1 - 2R)CO(f) + RH_2(f) = [-H_2O(l)](1-R) \quad (2b)$$

$$RCO_2(f) + RCO(f) + H_2(f) = [H_2(i) - H_2O(l)](1 - R) \quad (2c)$$

$$H_2O(f) = [RCO_2(f) + RH_2(f) + RH_2(f)]/(1 - R) \quad (3)$$

wherein:
$H_2O(l)$ = moles of $H_2O$, liquid, leaving condenser tank
$H_2O(f)$ = moles of $H_2O$, vapor, leaving condenser tank
$CO_2(i)$ = moles of $CO_2$ prior to shift reactor
$CO_2(f)$ = moles of $CO_2$ after shift reactor
$H_2(i)$ = moles of $H_2$ prior to shift reactor
$H_2(f)$ = moles of $H_2$ after shift reactor
CO (f) = moles of CO after shift reactor
$PH_2O(f)$ = vapor pressure $H_2O$ in condenser tank, from handbook
R = mole fraction $H_2O$ vapor in condenser tank = $P-H_2O(f)/P(t)$
P(t) = total pressure in condenser tank The value of "R" in the above system is determined from well-known Steam Tables, giving the vapor pressure of water at the temperature of the condenser tank. The quantity of liquid water in the condensation tank and the amount of carbon dioxide and hydrogen in the reagents before the shift reactor, and the total pressure in the condenser tank are all measured. In carrying out the calculations it was found that solving the first three equations 2a,b,c, and then solving the fourth equation, gives the best results.

The simultaneous equations used with the synthesis gas molecular weight measuring device and for the water knockout device following the shift reaction, are most readily solved using determinants with a suitable computer program.

Referring to FIG. 3, hydrogen gas, for example from the electrolysis of desalinated water, and carbon dioxide, for example obtained from the pyrolysis of an alkaline earth metal carbonate in a kiln, are admixed in a shift reactor 104, preferably at volume proportions of hydrogen-to-carbon dioxide of at least about 3:1. The shift reactor is operated at a combined total gas pressure of from about 3 to about 10 psig, and at a temperature of from about 1000° to about 1500° F. The shift reactor can be heated by electric furnaces, or, in the preferred commercial setting, is a part of the high temperature kiln for pyrolizing an alkaline earth metal carbonate or is subsequently provided for in the upstream of the methanol reactor.

Figure 6:
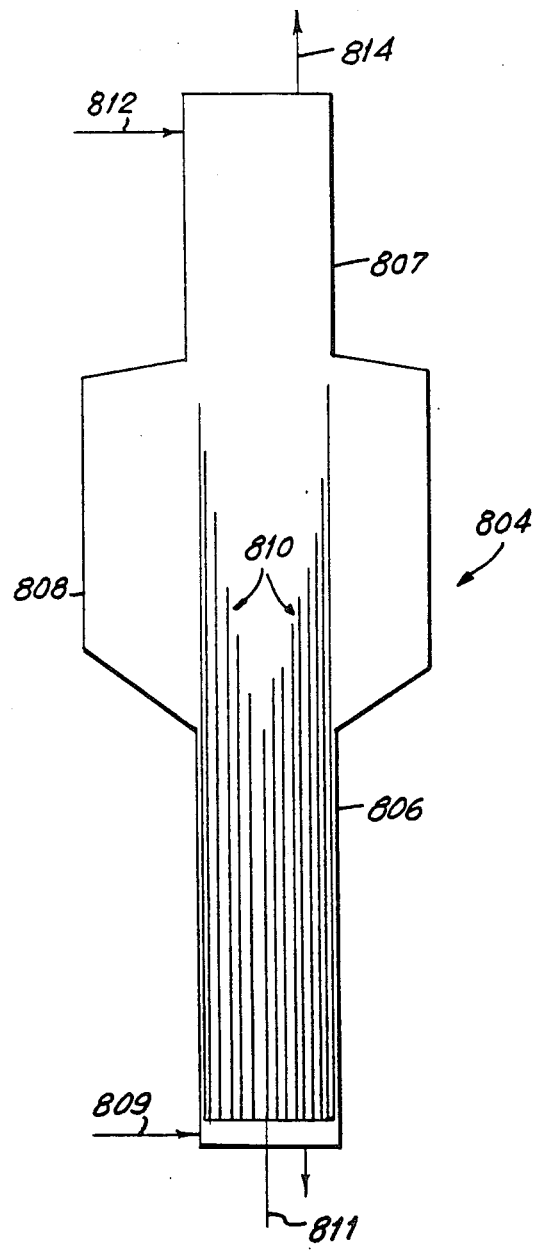
FIG. 6 is a schematic elevation view of a reactor kiln for use in the process of this invention.

Alternatively, referring to FIG. 6, hydrogen gas can be fed into a vertical kiln in an amount sufficient to provide the necessary heat to pyrolyze the calcium carbonate to carbon dioxide and calcium oxide by being burnt with oxygen; excess hydrogen is to be exhausted together with $CO_2$. In this embodiment, a vertical kiln generally designated as 804, is preferably divided into three vertical sections: a lower pre-heat section 806, (for example, about 2 ft. tall and with an internal diameter of about 7 ins.), an upper pre-heat section 807 (e.g. about 9 ins. in height and about 5 ins. in internal diameter), and a central heated reaction section 808, e.g. about 14 ins. in height and about 17 ins. in internal diameter). Hydrogen gas is injected into the bottom of the lower section 806 through a feed line 809, and is pre-heated by falling particles of spent calcined calcium oxide.

Oxygen gas is fed from a feed line 811 and through a plurality of thin tubes 810 (e.g. ⅛ in. internal diameter) rising upwardly through the lower section 806 and opening at various vertical levels in the central section 808, so that the oxygen is also pre-heated in the lower section 806 and injected to provide for substantially even burning of the hydrogen gas over the complete height of the central section 808. This provides a substantially even temperature along the reaction section height and avoids excessively high temperatures along the periphery which could damage the kiln walls.

Powdered calcium carbonate is fed into the kiln 804 at the top through solid feeder valve line 812, so that the powder is pre-heated as it falls downwardly through the rising hot gases, which exhaust through the top gas line 814.

The hot effluent gases containing hydrogen and carbon dioxide, and some carbon monoxide, are passed through separator systems, e.g. cyclones, to remove any fine particulate materials.

The hot effluent gases from the shift reactor 104, or from a kiln, then pass to a cooling tube 106, where they are cooled countercurrently to cooling water, to condense out the water of reaction which is then separated from the gases in the water knockout tank 108. From time to time, the water from the knockout tank 108 (when dealing with a shift reactor 106) is collected through the bottom outlet tank 109. The collection rate of condensed water is continuously monitored in the outlet tank 109 by determining the time between the actuation of two float switches 231, 232. When the second float switch 231 is activated the outlet tank 109 is dumped through the outlet 210. The collection of water is then repeated. Measuring the rate of water formulation determines the relative proportions of carbon monoxide and carbon dioxide prepared in accordance with the shift reaction I, as explained above.

The substantially water-free gases are removed overhead through line 118 from the knockout tank 108 and then passed into a low pressure buffer tank 110. When the pressure in the low pressure buffer tank 110 is at a suitable minimum value, the gas is passed through line 190 into the three-stage compressor 112, where the pressure of the synthesis gas is raised in three steps from about 15 psig up to about 450 to about 800 psig.

The high pressure gases are passed via line 119 into the high pressure buffer tank 114. The low pressure buffer tank 110 should have a total volume equal to about ten times the maximum volumetric flow per minute from the knockout tank 108, and the high pressure buffer tanks 114 should have a combined total volume of about ten times the volumetric flow per minute from the third stage of the compressor 112.

The pressurized synthesis gases, from the high pressure buffer tanks 114, are then fed into the second stage of the process, or the reaction loop, generally indicated by the numeral 100. The reaction loop comprises the multiple tube catalytic reactor 120, the main reaction heat exchanger 124, the condensing heat exchanger 126, the high pressure product knockout tank 128 and a sealed system recirculating pump 134.

The synthesis gases from the high pressure buffer tanks 114 first pass through line 116 and are admixed with recycle gas from line 137, a flow control meter 138 and then into the main heat exchanger 124, where they are preheated by being passed countercurrently to the reactor product gases. The preheated synthesis gases then pass through line 125 into the inlet manifold 121 of the synthesis reactor, generally indicated by the numeral 120, and then through accurately machined sonic flow orifices into the individual reactor tubes 122.

The reaction tube bundle is enclosed in a water bath to maintain a substantially constant temperature, e.g., of about 450° F. to about 500° F. This temperature has been found to provide a desirably fast reaction rate to form methanol without comprising the also desired efficiency at lower temperatures.

The effluent from the reactor tubes then passes into the reactor outlet manifold 123 and out via line 127 into the high temperature end of the countercurrent main heat exchanger 124 from which it exhausts via line 129 to the tubes within condensing heat exchanger 126. The condensing heat exchanger 126 is cooled by cooling water flowing countercurrently to the gases; the cooled and condensed product then exhausts into the high pressure product knockout tank 128. The condensing heat exchanger extends downwardly so as to permit run-off of any condensed liquid into the knockout tank 128 via line 131.

The gaseous effluent from the product knockout tank 128 is then passed back from the upper portion of the knockout tank 128 via line 133 to the recirculation pump 134, where it is repressurized to the pressure of the reactant gases from the high pressure buffer tanks 114.

The recirculating pump 134 comprises a simple gas blower 234 placed within a steel high-pressure tank 235 maintained at the elevated system pressure. A blower is sufficient for this purpose because it is only necessary to increase the pressure a relatively small amount to bring the recycle gases back up to the pressure in the synthesis loop 100 and to maintain the necessary flow.

The repressurized gases are recycled through line 137 after being admixed with fresh makeup gases from the high pressure buffer tank 114. The flow from the high pressure buffer tank 114 must be carefully controlled such that the total synthesis gas flow through the main heat exchanger 124, recycle gas plus make-up gas, meets the requirements for the reactor 120.

Figure 5:
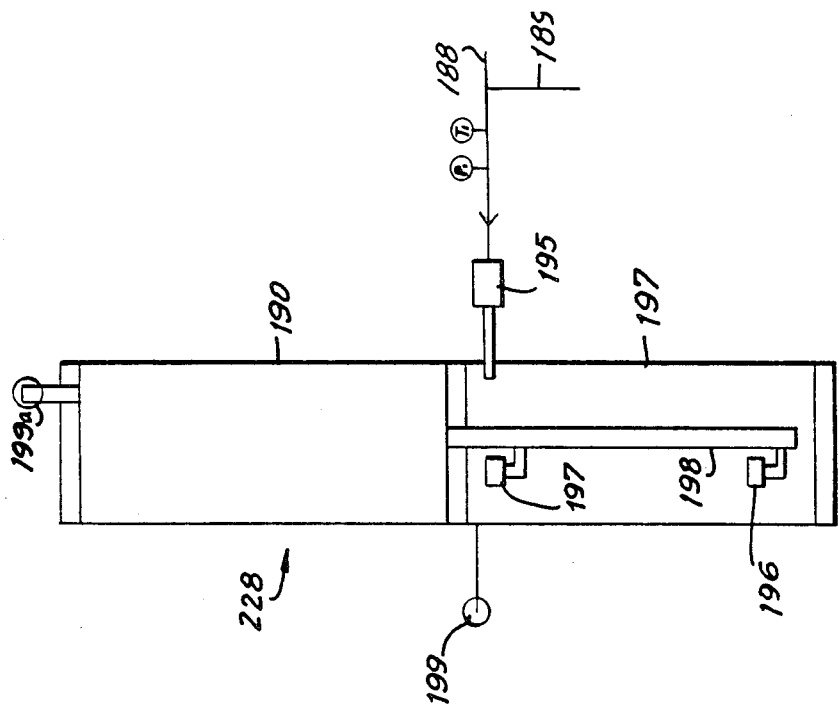
FIG. 5 is a schematic elevation view of the synthesis gas molecular weight determination device of this invention.
Figure 4:
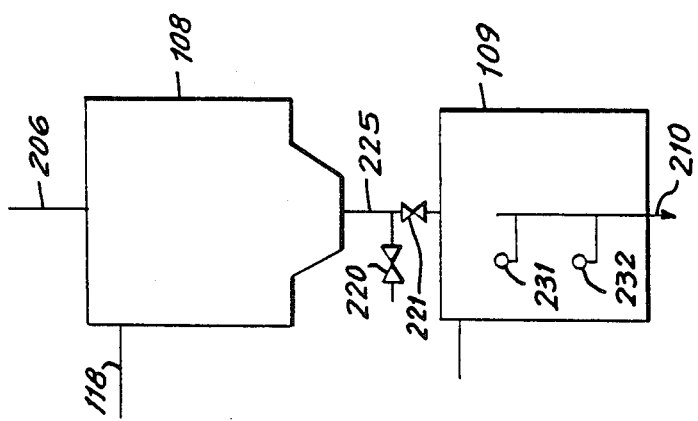
FIG. 4 is a schematic elevation view of a water-formation monitoring device for this invention.

In order to determine and control the proportions of hydrogen: carbon in the synthesis gases, the recycle gas and the combined synthesis gas may each be analyzed to obtain an average molecular weight: samples are taken from the line immediately downstream of the product knockout tank 128 and through the line 188 immediately upstream of the main heat exchanger 124. The sample gas is permitted to flow through a sonic orifice 195 (for example having a diameter of about 0.004 in.), into a volumetric flow rate analyzer, generally indicated as 228, (and shown enlarged in FIG. 5). The flow rate analyzer 228 comprises a pair of mutually inverted connected siphon tanks 190, 191. The lower tank, 191, preferably, contains two vertically disposed float switches 196, 197 and a siphon, or stand, tube 198 forming thereby a flow connection between the lower tank 191 and the upper tank 190, each of which can be separately vented through vent lines 199, 199a. The time for the displacement of a known volume of inert liquid, generally water, from the lower tank 191 to the upper tank 190 is measured by the time between the tripping of the two float switches 196, 197, as the liquid is forced from the lower tank 191 by the gas entering from the orifice 195. The average molecular weight of the gases can be determined by mathematical formulae defined above if the temperatures and pressures and other indicated data are measured by any of the well-known means. The "reactor line" pressure and temperature are measured immediately upstream of the orifice 195. A useful size for the equipment provides for a displacement volume (between the two float switches) of about 0.1 to about 0.15 cubic feet (ft.$^3$) and a sonic orifice diameter of about 0.004 in. The average molecular weight of the synthesis gas should be between about 6.5 and about 7.5. The results of the molecular weight determination can be used to control the individual flow of carbon dioxide and hydrogen, as well as the admixture of the recycle gas and makeup gas in the system.

The condensed liquid product is passed from the knockout tank 128, in discrete aliquots, through the reaction product holding tank 140, the methanol condenser coil 147 and to the still boiler 144. The reservoir in the knockout tank 128 is maintained closed until a given amount of liquid is collected, at which point a valve opens and a specified volume of liquid is permitted to pass to the holding tank of the still 140; the valve is then closed and liquid is again permitted to accumulate up to the desired volume. The maintenance of a minimum liquid volume in the knockout tank 128 provides for a liquid seal. The distillation column is operated on the basis of discontinuous liquid feed.

The still portion of the system includes the distillation column 142, the boiler 144, the reaction product holding tank 140, the reflux drum 146, the methanol condenser 147 and the product holding tank 149. The still can be operated, in a known way, to provide a range of products from substantially pure methanol to a various concentrations of water-and-methanol solution.

Preferably, the still boiler 144 is electrically heated.

The heated methanol-water product from the still boiler 144 is fed to a mid-point of the still column 142. The upwardly rising vapors are condensed in the methanol condenser 147, and partially removed as product and partially refluxed. The downwardly moving liquid is passed back to the boiler 144 from the bottom of the column 142.

It has been found, that by monitoring the various flow rates, temperatures, pressures and compositions, of the process materials, and calculating values utilizing a computer, programmed for such purpose, and then feeding back the results of these computations for purposes of controlling the process, a highly efficient and effective procedure can be provided for obtaining the desired pure products with a minimum of energy cost.

WORKING EXAMPLE I

In a preferred example of the above invention, hydrogen gas at 7.05 SCFM and carbon dioxide gas at 2.35 SCFM are passed into a shift reactor at a total pressure of 4.5 psig. The temperature in the shift reactor is maintained at not higher than 1250° F., the inlet temperature being 70° F. Following cooling in condenser cooler 106, the synthesis gas is at a temperature of 80° F. and contains preferably about 6.8% $CO_2$, 8.8% CO, and 84.5% $H_2$ by volume. Water, in an amount of approximately 3.42% by weight of total material, is present in the outlet from the shift reactor, as shown by the amount of water removed from the water knockout drum 108; the gas flow to the three-stage compressor 112 is 8.24 SCFM. The pressure at the knockout drum 108 is about 2.65 psig and the pressure downstream from the outlet of the three stage compressor 112 is 850 psig.

Within the reactor loop 100, a system pressure of at least about 750 psig is maintained. The synthesis gas entering the main heat exchanger 124 is heated from about 80° F. to about 210° F. before entering the reactor 120. By providing adequate heating capacity, the reactor tubes 122 are maintained at a temperature in the range of between about 400° and 500° F. and the product gases exiting from the outlet manifold 123 of reactor 120 are at a temperature of not lower than preferably 425° F.; the product gases are then cooled on the hot side of the main heat exchanger 124 to an outlet temperature of about 90° F. The gases are then further cooled and condensed in the condenser 126 to the condensation temperature of about 86° F.

The average molecular weight of the recycle gas from the product knockout drum 128 is preferably not greater than about 5.5, and most preferably at about 5.4, and the average molecular weight of the total synthesis gas fed to the heat exchanger 124 is about 5.9.

WORKING EXAMPLE II

When the carbon dioxide is to be obtained from a metal carbonate feed, a three-stage kiln, as shown in FIG. 3, can be used. It is desired to produce an initial reagent gas (3 moles $H_2$ per mole $CO_2$). If the desired rate is about 27 lbs $CO_2$/hr and 2 lbs $H_2$/hr from a kiln of the type shown in FIG. 6, 67 lbs/hr of powdered $CaCO_3$ is passed to the kiln; the dimensions of the kiln are as follows:

upper pre-heat section: 9 ins. high, 5 ins. i.d.
mid-reactor section: 14 ins. high, 17 ins. i.d.
lower pre-heat section: 25 ins. high, 7 ins. i.d.

The solid carbonate can have a useful size distribution as follows:

five equal weight fractions, having an average diameter of 0.0071 in., 0.0089 in, 0.01125 in., 0.01416 in., and 0.0178 in., respectively.

The oxygen 2.7 SCFM, is carried in tubes 810 which have a ⅛ in. i.d. and open upwardly within the central section. The tubes are distributed along the height of the central section 808 such that 24% is injected at the bottom of the mid-section, and further incremental injections are made from the tubes at one inch vertical intervals thereabove as follows:

| Height above initial injection(in.) | Cumulative Percent Total of Oxygen |
|---|---|
| 1 | 25 |
| 2 | 30 |
| 3 | 35 |
| 4 | 40 |
| 5 | 45 |
| 6 | 52 |
| 7 | 58 |
| 8 | 66 |
| 9 | 74 |
| 10 | 82 |
| 11 | 98 |
| 12 | 100 |

The total flow of hydrogen into the kiln is 18 SCFM. Under the above design conditions, the decomposition efficiency for the $CaCO_3$ is 95%. At 75% of the above flow rate, the efficiency drops to about 76%.

Figure 7:
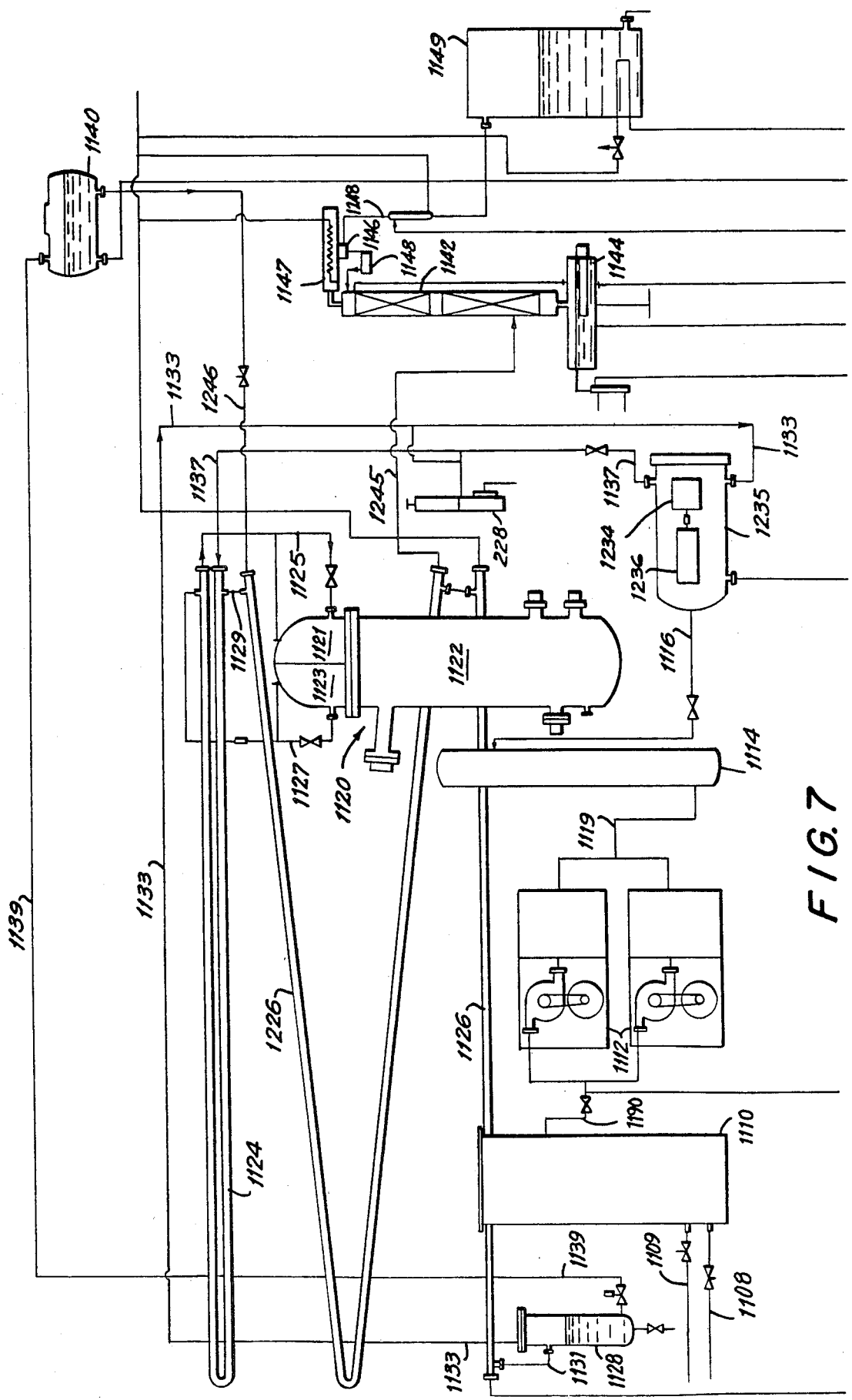
FIG. 7 is a schematic flow diagram of an alternative system for preparing methanol.

In a further alternative methanol production system in accordance with this invention, as shown in FIG. 7, substantially water-free hydrogen and carbon dioxide gases are passed into a low pressure buffer tank 1110 from feed lines 1108 and 1109, respectively as additional make-up gas is needed, the mixed gases are passed from pressure buffer tank 1110 through line 1190 into one or both of the parallel compressors 1112, depending upon the magnitude of the required make-up gas flow rate, where the pressure of the make-up gas is raised from about 15 psig up to about 450 to about 800 psig.

The pressurized gases are passed via line 1119 into the high pressure buffer tank 1114.

The pressurized make-up gases, from the high pressure buffer tank 1114, are then fed into the sealed system, recycle tank 1235.

A recirculating gas blower 1234 is placed within the steel high-pressure recycle tank 1235, and the make-up gas mixes with recycle gas in the tank. The electric motor 1236 for the blower 1234 is also located within the tank 1235; thus, any heat generated by the blower is applied to heat up the synthesis gas. A blower is sufficient for this purpose because it is only necessary to increase the pressure of the mixed recycle and make-up gases a relatively small amount to bring the mixed synthesis gases back up to the pressure required for the synthesis reaction and to maintain the necessary flow.

The repressurized mixed gases are recycled through line 1137 to the main heat exchanger 1124, where they are preheated by being passed countercurrently to the reactor product gases. The preheated synthesis gases then pass through line 1125 into the inlet manifold 1121 of the synthesis reactor, generally indicated by the numeral 1120, and then through accurately machined sonic flow orifices into the individual U-shaped reactor tubes 1122. The reactor tubes are each preferably empty over the initial upstream one-quarter or one-third of their lengths to provide further pre-heating and as a shift reactor to provide the desired proportion of carbon monoxide of above the preferred minimum of 1.5% by volume.

The reaction tube bundle is enclosed in a pressurized water bath to maintain a substantially constant temperature, e.g., of about 450° F. to about 500° F. This temperature has been found to provide a desirably fast reaction rate to form methanol without compromising the desired efficiency at lower temperatures.

The effluent from the reactor tubes then passes into the reactor outlet manifold 1123 and out via line 1127 into the high temperature end of the countercurrent main heat exchanger 1124 from which it exhausts via line 1129 to the shell side of the intermediate heat exchanger 1226, where it is further cooled co-currently by the condensed liquid raw product. The cooled and partially condensed reaction product is then passed to the condensing heat exchanger 1126 where it is cooled by cooling water flowing co-currently to the reaction product. The cooled and condensed product then exhausts into the high pressure product knockout tank 1128 through line 1131. The intermediate and final condensing heat exchangers 1226, 1126, extend downwardly so as to permit run-off of any condensed liquid into the knockout tank 1128 via line 1131.

The non-condensed effluent from the product knockout tank 1128 is then recycled from the upper portion of the knockout tank 1128 via line 1133 to the recirculation tank 12535, where it is mixed with the make-up reactant gases from the high pressure buffer tank 1114, and repressurized to the pressure of the reactor 1120.

The flow from the high pressure buffer tank 1114 must be carefully controlled such that the total synthesis gas flow through the main heat exchanger 1124, recycle gas plus make-up gas, meets the requirements for the reactor 1120.

In order to determine and control the proportions of hydrogen: carbon in the synthesis gas, the recycle gas from the recycle line 1133 and the combined synthesis gas from line 1137 may each be analyzed to obtain an average molecular weight: samples are taken from the recycle line 1133 downstream of the product knockout tank 1128 and from the synthesis gas line 1137 immediately upstream of the main heat exchanger 1124.

The condensed liquid product is passed from the knockout tank 1128, through the raw product holding tank 1140, to the intermediate heat exchanger where it is again vaporized and then to a midpoint of the still column 1142. This substantially reduces the load on the still boiler 1144.

The still portion of the system includes the distillation column 1142, the bottom tank 1144, the raw product holding tank 1140, the reflux drum 1146 and reflux pump 1148, the methanol condenser 1147 and the product holding tank 1149. The still can be operated, to provide a range of products from substantially pure methanol to various concentrations of water-and-methanol solution.

Preferably, the vaporized feed from the intermediate heat exchanger 1226 enters the still column 1142 approximately one-third of the height up from the bottom. The bottoms tank 1144 can be electrically heated at start-up, but the still temperature is thereafter maintained by the vaporized product from the heat exchanger 1226.

The vaporized methanol product leaving the top of the still column 1142 is condensed in the methanol condenser 1147, and partially removed as product via the product line 1248 to the product holding tank 1149, and partially refluxed from the reflux drum 1146, by reflux pump 1148 to the top of the still column 142. The downwardly moving liquid effluent, mainly water at the bottom of the column 1142, flows out to the bottoms tank 1144, and is then disposed of.

By monitoring the various flow rates, temperatures, pressures and compositions, of the process materials, and calculating values utilizing a computer, programmed for such purpose, and then feeding back the results of these computations for purposes of controlling the process. This embodiment can also be most suitably controlled and monitored by a computer system.

SOLAR-POWERED ENGINE AND PUMP

The following is a description of a high capacity low-heat engine and, more particularly, a high capacity solar powered water pump that is well adapted for use in less developed countries. The solar powered water pump is designed to operate unattended and to require very little maintenance and to have a useful life of twenty years or more. In addition, the solar powered water pump is designed so that it can be manufactured in less developed countries.

Figure 8:
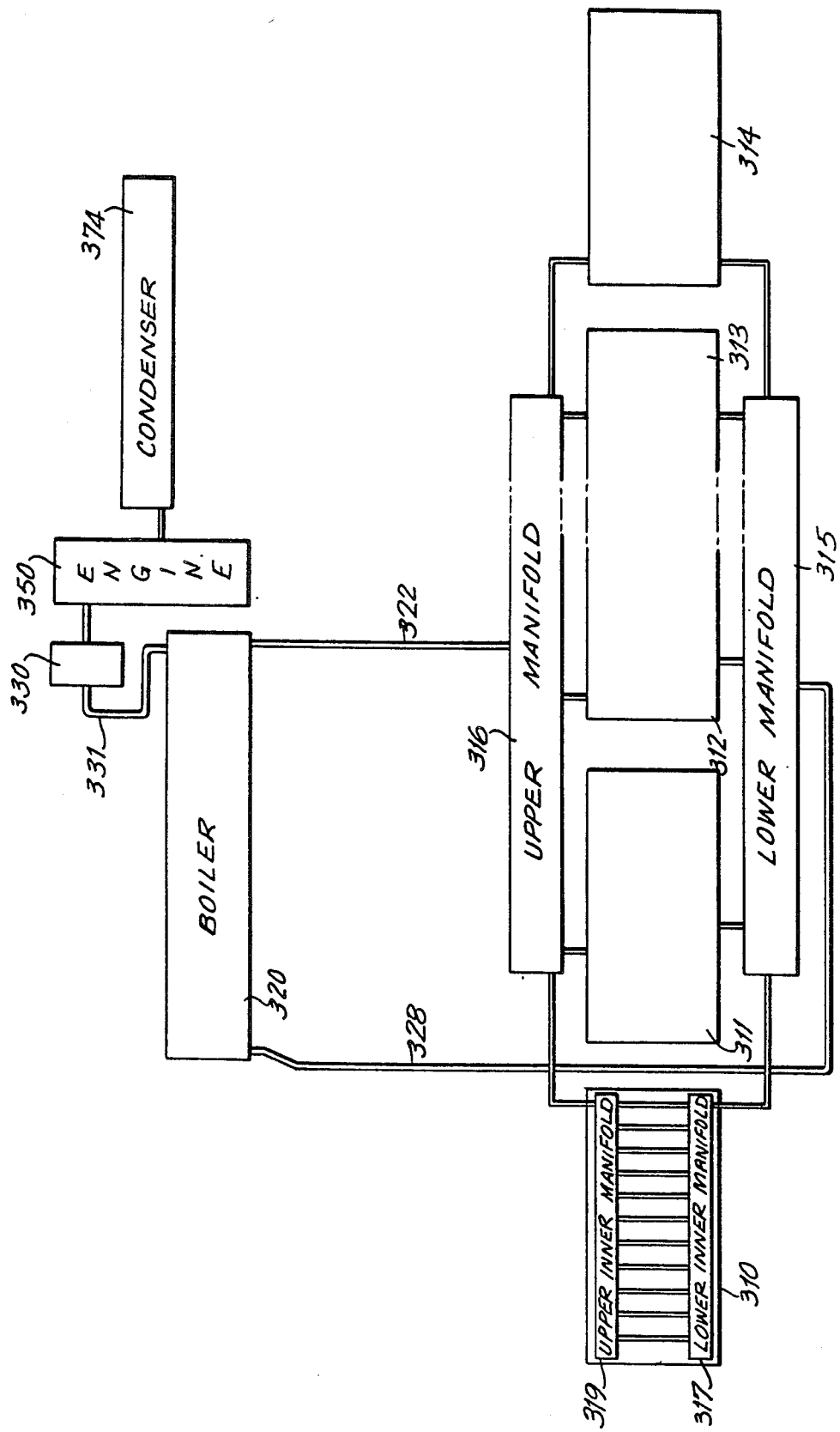
FIG. 8 is a schematic diagram of a low heat engine embodying the present invention.

Referring to FIG. 8, there is shown a diagram of the arrangement of the major components of the solar powered water pump. Solar collector panels 310-314 are arranged below boiler 320 in order to take advantage of the thermal siphon effect. In the preferred embodiment twenty-four solar collector panels are connected in parallel between a lower manifold 315 and an upper manifold 316. Within each solar collector panel 310-314 there is a lower sub-manifold 317. Lower manifold 315 is connected to each of the lower sub-manifold 317 connected by a plurality of collector tubes 318 to an upper sub-manifold 319. Lower manifold 315 is connected to each of the lower sub-manifolds 317 of the collector panels 310-314. Upper manifold 316 is connected by pipe 322 to boiler 320, and the return water from boiler 320 is connected by pipe 328 to lower manifold 315.

Collector panels 310-314 are sloped so that the upper sub-manifold 319 is approximately 2 feet higher than lower sub-manifold 317. In addition, boiler 320 is preferably disposed approximately 8 feet higher than upper sub-manifolds 319. This arrangement allows for a natural circulation of heated water upward from the solar collectors 310-314 through manifold 316 to boiler 320 and the return of cooler water from boiler 320 to lower manifold 315 according to the thermal siphon principle so that no pumping of the solar heated water is required.

Referring to FIG. 9 of the drawings, hot water from the solar collector panels enters the boiler 320 through pipe 322. Disposed within boiler 320 is a heat exchanger assembly comprising a lower manifold 324 connected to an upper manifold 325 by a plurality of heat exchanger tubes 326. Cool water returns via pipe 328 from the boiler 320 the lower manifold 315 shown in FIG. 8. The working fluid enters lower manifold 324 by way of conduit 327 and is boiled to gas as it passes through heat exchanger tubes 326 to upper manifold 325. In the preferred embodiment, Freon is used as the working fluid, although other volatile working fluids having similarly low heat of vaporization can be used within the scope of the invention.

Alternatively, freon or the like can be place directly into the solar collectors, eliminating the water system. This should increase the output from the same number of collectors.

In the preferred embodiment boiler 320 is approximately 1½ feet deep. Increasing the depth and volume of boiler 320 will increase the thermal inertia of the system. That is, if a larger, deeper boiler 320 is used the system will tend to run longer after the sun goes down, but will start slower after the sun comes up. It will be appreciated that, although solar collector panels 310-314 provide the source of heat in the preferred embodiment of the subject low heat engine, other sources of heat, such as industrial waste heat, can be used within the spirit and scope of the present invention.

A start-stop control cylinder 330 is located in the conduit 331 between the boiler 320 and the engine, generally designated 350. Start-stop control cylinder 330 prevents the gas from flowing from boiler 320 to the engine 350 unless the gas pressure on the boiler side of the control cylinder 330 exceeds the gas pressure on the engine side of control cylinder 330 by a certain predetermined amount.

The function of start-stop control valve 330 is to prevent gas from gradually bleeding from the boiler 320 to the engine 350 as the sun comes up in the morning. Such bleeding of pressure to engine 350 could gradually fill engine 350 with liquid to full pressure before causing its piston to move. The start-stop control valve 330 prevents this undesirable situation by cutting off the flow gas from the boiler 320 to the engine 350 until the pressure differential is high enough to successfully start the operation of engine 350.

Referring to FIGS. 10A and 10B of the drawings, there is shown a detailed cross-section of the preferred form of start-stop control valve 330 according to the present invention. Briefly, start-stop control valve 330 comprises a piston assembly 332 which slides freely within cylinder 333. Gas under pressure from the boiler 320 enters cylinder 333. Gas under pressure from the boiler 320 enters cylinder 333 via conduit 331 and exists from cylinder 333 to engine 350 via conduit 334.

FIG. 10A shows the start-stop control valve 330 in its closed position. Large diameter section 335 of piston 332 blocks the flow of gas from inlet conduit 331 to exit conduit 334. However, gas under pressure is led via conduit 336 to chamber 337 of cylinder 333 where it acts upon the small end 338 of free sliding piston assembly 332. When the gas exerts sufficient pressure against end 338 of piston 332, piston 332 will rise within cylinder 333 until reduced diameter section 339 is in position to allow gas from inlet conduit 331 to flow through to exit conduit 334 as shown in FIG. 10B.

The pressure differential required to open start-stop control valve 330 is determined by the relationship of the area of small end 338 to the weight of free sliding piston 332. A magnetic plug 342 is located at the upper end of cylinder 333 shown in FIGS. 10A and 10B to retain the piston 332 in the open position until the gas pressure from boiler 320 drops sufficiently that the relative vacuum in chamber 337 of cylinder 333 acts on end 338 to draw piston 332 back to the closed position shown in FIG. 10A. According to the preferred form of the present invention, the strength of magnetic plug 342 would be such that piston 332 would be retained in the open position despite pressure drops such as might be experienced when the sun is temporarily obscured by clouds. Start-stop control valve 330 is preferably designed so that the piston 332 moves to the closed position shown in FIG. 10A only in response to the substantial reduction of pressure associated with the cooling of the boiler 320 after sundown.

Although FIGS. 10A and 10B show the preferred form of start-stop control valve for use in the present invention it will be appreciated by those skilled in the art that other forms of control valves can be used within the overall spirit and scope of the present invention.

Figure 11:
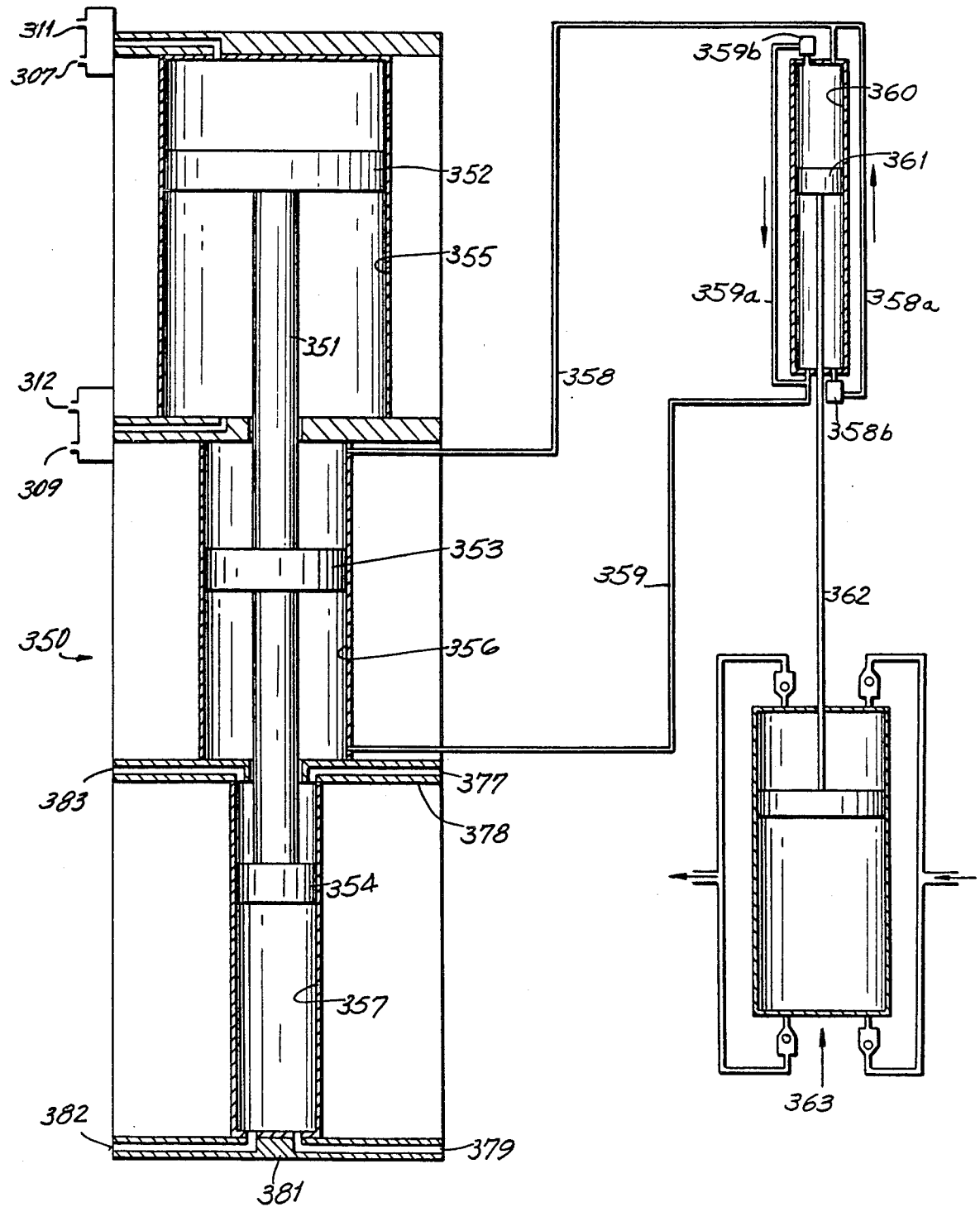
FIG. 11 is a cross-sectional diagram of the subject low heat engine showing three pistons mounted on a common shaft, hydraulic slave cylinder and water pump.

Referring to FIG. 11 of the drawings, there is shown a schematic diagram of the preferred form of engine 350 according to the present invention. In its preferred form, engine 350 comprises a shaft 351 on which are mounted three pistons 352, 353, and 354. Piston 352 slides within gas expansion cylinder 355. Piston 353 slides within hydraulic cylinder 356. Piston 354 slides within working fluid pump cylinder 357. The location of the hydraulic cylinder 356 between the expansion cylinder 355 and the pump cylinder 357 conveniently provides lubrication of shaft 351 by hydraulic fluid during operation of the engine 350.

Hydraulic cylinder 356 is connected by hydraulic lines 358 and 359 to a slave, or work, cylinder 360. When the hydraulic piston 353 moves down within the hydraulic cylinder 356, hydraulic fluid flows through a line 359 to force a piston 361 to the top of the work cylinder 360. When hydraulic fluid flows through the line 358, it drives the piston 361 to the bottom of the work cylinder 360.

It will be appreciated by those skilled in the art that, although the diameter and stroke of the work cylinder 360 may be altered to fit particular work applications, the volume of the work cylinder 360 must match the volume of the hydraulic cylinder 356. In order to adjust for small imbalances in the hydraulic circuit, the work cylinder 360 is preferably provided with a pair of relief lines 358a and 359a. When the piston 361 reaches the top of its travel, it opens a check valve 359b which allows hydraulic fluid to flow from the top of the cylinder 360 via the relief line 359a to the bottom of the cylinder 360. Similarly, when the piston 361 reaches the bottom of its travel it opens a check valve 358b which allows fluid to flow via the relief line 358a from the bottom to the top of cylinder 360.

In the preferred form of the present invention, the work piston 361 shown in FIG. 11 is connected by a shaft 362 to a water-pump 363. The preferred embodiment of the present solar powered water pump using an array of twenty-four solar collector panels, as described above, is capable of pumping 40,000 gallons of water a day. Alternately, the piston shaft 351 of the solar engine 350 can be directly coupled mechanically to the work load, such as the water pump.

It will be appreciated, however, that the applications of the present solar engine are not limited to pumping water. For example, the output from the solar engine can be used to perform a variety of tasks e.g. driving a refrigeration system, a reverse osmosis system, or an air conditioning system.

Referring again to FIG. 9 of the drawings, gas under pressure from the boiler 320 is conducted by the high pressure manifold 365 to shuttle valves 366 and 367 which are mounted on the cylinder heads 368, 369, respectively, of the expansion cylinder 355. Preferably the shuttle valves are mechanically interconnected, which tends to improve timing. Exhaust gas is conducted from shuttle valves 366 and 367 by the exhaust manifold 371 through a conduit 372 to the upper manifold 373 of condenser 374. In the preferred embodiment of the present invention, the condenser 374 comprises a water jacket through which water driven by the pump 363 shown in FIG. 11 circulates. The upper manifold 373 is connected by a plurality of condenser tubes 375 to a lower manifold 376. The condensed liquid working fluid is then conducted by a conduit 377 to the upper cylinder head 378, and by another conduit 379 to lower cylinder head 381 of the liquid, working fluid pump 357. Conduits 377, 379 are preferably provided with suitable check valves to prevent the reverse flow of liquid working fluid. The action of the pump 357 alternately pumps liquid working fluid through exhaust conduits 382, 383 via a conduit 384 to the lower boiler manifold 324, thus completing the working fluid cycle. Exhaust conduits 382, 383 are also preferably provided with check valves to prevent reverse flow.

Figure 12:
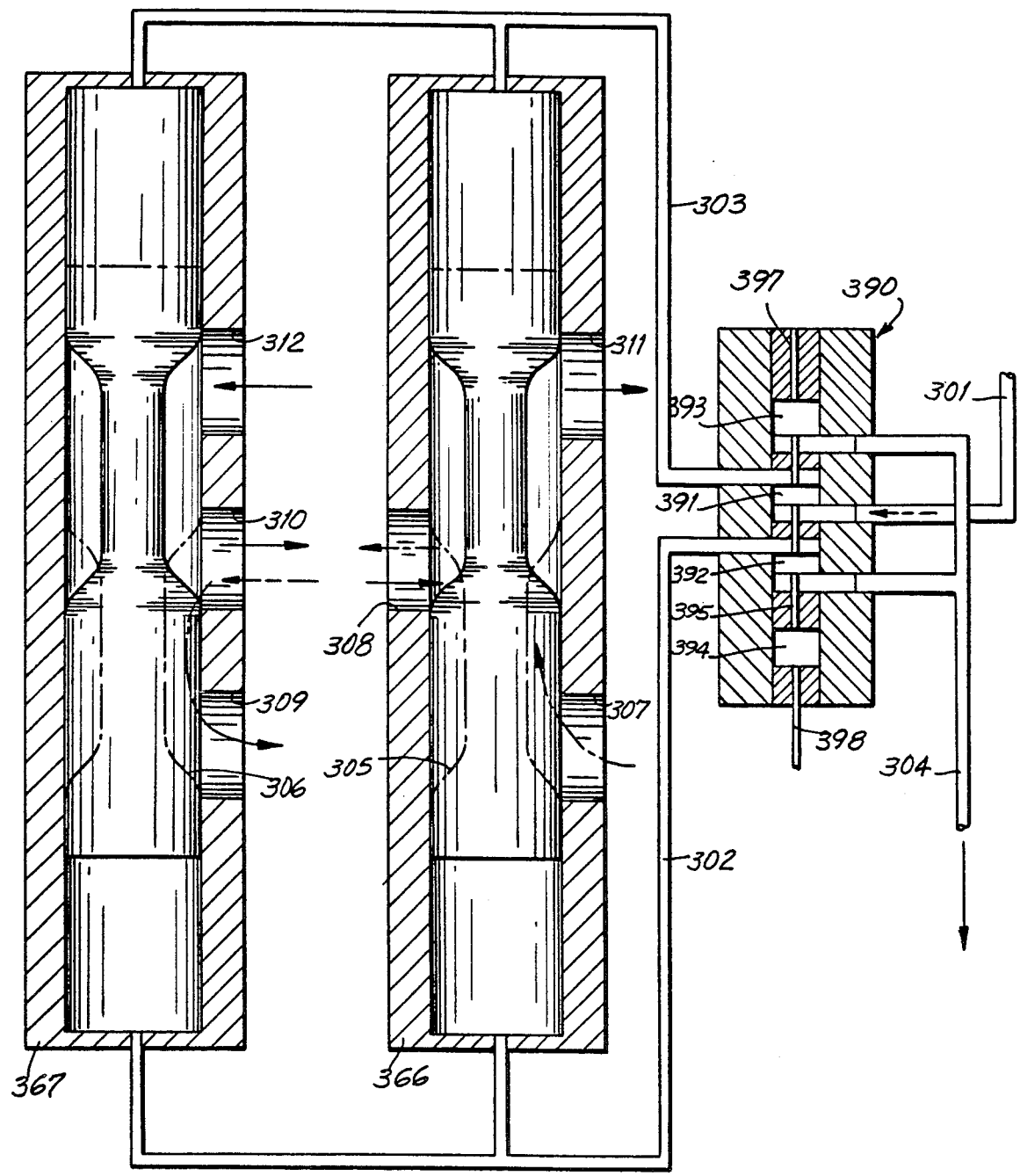
FIG. 12 is a cross sectional diagram of the shuttle control valves of the subject low heat engine.

Referring to FIG. 12 of the drawings, there is shown a detailed cross-sectional view of the shuttle valves 366, 367 shown in FIG. 9. The shuttle valves 366, 367 are controlled by a pilot valve 390 which is mounted in the cylinder head 369 located between the expansion cylinder 355 and the hydraulic cylinder 356, as shown in FIG. 9. A pilot valve 390 comprises a pair of control valves 391, 392 and a pair of seals 393, 394 mounted on a common shaft 395. The entire assembly of the shaft 395, control valves 391, 392 and seals 393, 394 slides freely within a sleeve 396 so that either the first end 397 of the shaft 395 projects into the expansion cylinder 355, or the second shaft end 398 projects into the hydraulic cylinder 356 as shown in FIG. 9. Accordingly, the shaft 395 of the pilot valve 390 is moved from one extreme of its travel to the other by being alternately contacted by the expansion piston 352 and the hydraulic piston 353, shown in FIG. 11.

One alternative to the pilot valves 390 is a pair of check valves, for example of the type that can be seemed directly to the head of the expansion cylinder. One check valve is normally open (exhaust valve), the second check valve normally closed (intake valve). The piston will directly close the exhaust check valve and open the intake check valve at the end of its stock.

In the view shown in FIG. 12, the expansion piston 352, shown in FIG. 11, has just contacted the end 397 of shaft 395 causing it to move to its lower position. In this position, a high pressure line 301 from the high pressure manifold 365, shown in FIG. 9, is connected to a line 302 leading to the top shuttle valve 366 and the bottom shuttle valve 367. The same time, conduit 303 from the shuttle valves 366, 367 is connected via an exhaust line 304 to the exhaust manifold 371, shown in FIG. 9. The upper shuttle valve slider 305 and the lower shuttle valve slider 306 are both shown in phantom lines in their lower positions prior to movement induced by pressure in the line 302. In its lower position, the upper shuttle valve slider 305 connects the high pressure port 307 to the cylinder port 308 while the bottom shuttle slider 306 connects exhaust port 309 to cylinder port 308. This positioning of the shuttle valve sliders 306, 307 causes the expansion piston 352 to move downward to the lowest extent of its travel to contact the pilot valve shaft end 397.

Pressure in the line 302 causes the upper shuttle valve slider 305 and the lower shuttle valve slider 306 to move to their upper positions. In its upper position, the upper shuttle valve slider 305 connects the cylinder port 380 to exhaust port 381 while the lower shuttle valve slider 306 connects the cylinder port 380 to the high pressure port 382.

The high pressure line 301 and high pressure ports 307, 382 are connected to the high pressure manifold 365 shown in FIG. 9. The exhaust line 304 and exhaust ports 309, 381 are connected to the exhaust manifold 371.

High pressure at the cylinder port 308 causes the expansion piston 352 to move upward to the full extent of its travel, whereupon the hydraulic cylinder piston 353 contacts the end 398 of the valve shaft 395 moving it to its upper position. In its upper position, control valve 391 blocks the conduit 303 from the exhaust line 304 while connecting the high pressure line 301 to the conduit 303. Similarly, the control valve 392 blocks the high pressure line 301 from the conduit 302 while opening the conduit 302 to the exhaust line 304. This action causes the shuttle valve sliders 305, 306 shown in FIG. 12 to move to their lower positions which in turn causes the expansion piston 352 to move downward once again, thus completing the cycle of operation of the engine 350. It will be apparent that this cycle of operation will continue as long as the pressure differential between the high pressure manifold 365 and the exhaust manifold 371 is sufficient to overcome the work load imposed on the engine 350 through the hydraulic cylinder 356.

The solar powered pump is most effectively used in the total energy system of this invention to provide the power for a reverse osmosis device for the providing of desalinated, fresh, water.

REVERSE OSMOSIS DESALINIZATION SYSTEM

Figure 13:
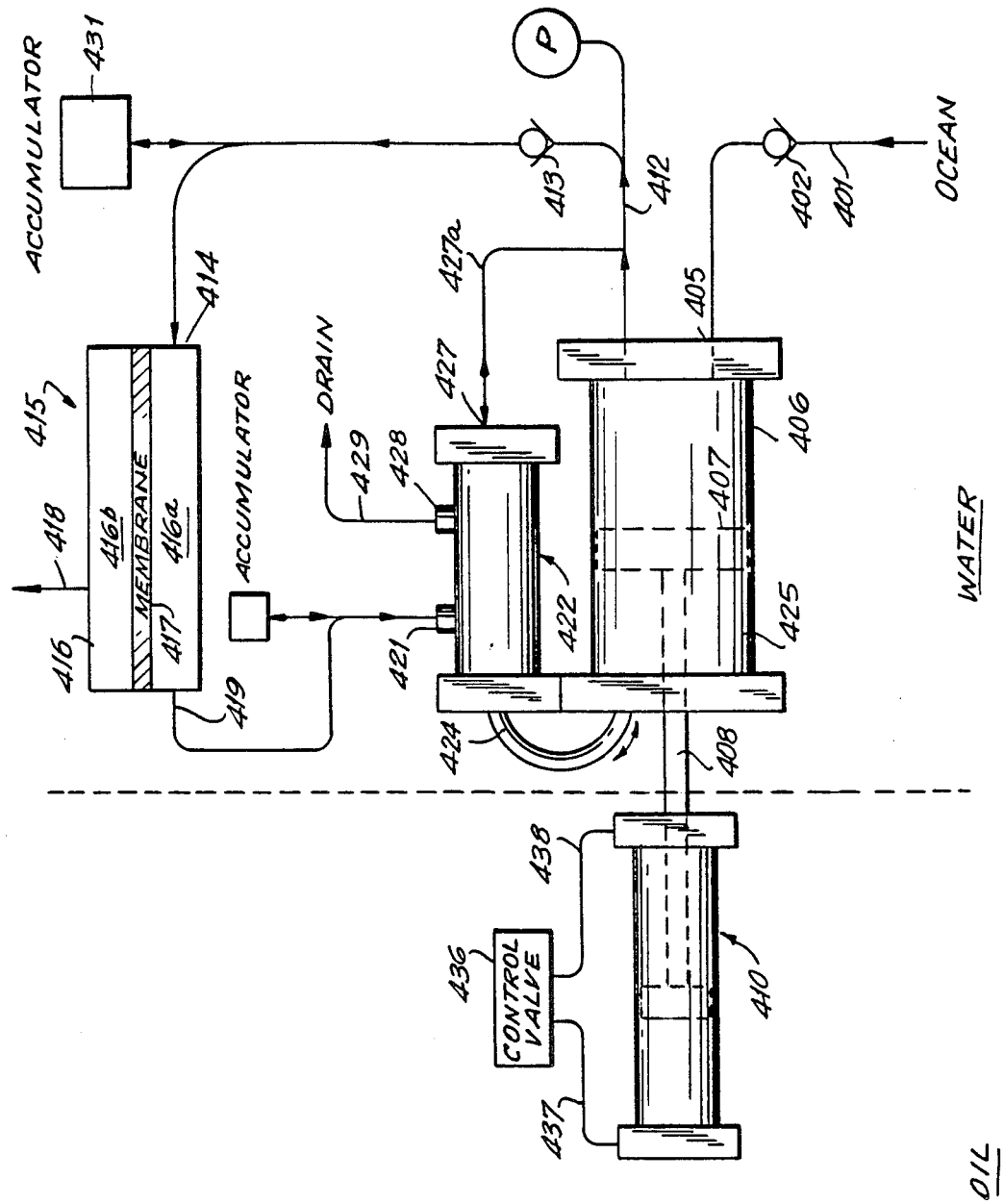
FIG. 13 is a schematic diagram of the several elements of the reverse osmosis apparatus of this invention.

FIG. 13 shows the elements of the reverse osmosis apparatus, of this invention. Sea water is drawn through an intake conduit 401 and a check valve 402 into the intake side 405 of a pump cylinder 406, as a pump piston 407 is drawn to the left by an operating rod 408. The operating rod 408 is connected to drive means 410 which may be mechanical, hydraulic (especially the solar powered pump of this invention), or other drive means suitable for driving the piston 407 through its cycle of operation.

When the piston 407 is driven to the right, the check valve 402 closes, and sea water is driven via an outlet conduit 412 through a check valve 413 to the inlet 414 of a reverse osmosis membrane module 415. The reverse osmosis membrane module 415 may be of a type known to those skilled in the art which generally comprises a high pressure container 416 containing a semipermeable membrane 417 separating the high pressure container into a salt water chamber 416a and a fresh water chamber 416b. There is a sea water inlet 414 and a waste water outlet 419 from salt chamber 416a and a fresh water outlet 418 from fresh water chamber 416b. High pressure waste salt water passes via the waste outlet 419 to a port 421 of a shuttle valve 422.

Although the structure and operation of the novel shuttle valve 422 will be described in greater detail in connection with FIGS. 15a and 15b, it is sufficient now to note that when the piston 407 moves to the right, pressure is communicated via a control line 427 to cause shuttle valve 422 to operate in such a way as to connect waste water from the outlet 419 of the membrane module 415 through the shuttle valve inlet 421 and a waste outlet conduit 424 to the outlet chamber 425 of the cylinder 406. When the piston 407 moves to the left, the greater pressure in outlet chamber 425 is communicated via the waste outlet conduit 424 to cause the shuttle valve 422 to connect the waste outlet conduit 424 to the shuttle valve outlet 428, which is connected to waste water drain 429.

In the preferred form of the present reverse osmosis apparatus, an accumulator 431 is connected in the line between the outlet check-valve 413 and the membrane module inlet 414. A second accumulator 432 is located in the line 419 between inlet port 421 of shuttle valve 422 and outlet 419 of membrane module 415. The accumulators 431 and 432 serve to cushion the hydrostatic shocks which occur when the piston 407 changes its direction of travel.

In the preferred embodiment of the present reverse osmosis apparatus, the drive means 410 is a hydraulic actuator including a hydraulic piston 434 disposed within a cylinder 435, and a control valve 436 for directing high pressure hydraulic fluid via a left pressure line 437 to drive the hydraulic piston 434 from left to right, and, alternately, via a right pressure line 438, to drive the hydraulic piston 434 from right to left. The hydraulic piston 434 is connected by the drive rod 408 to the pump piston 407.

Referring now to FIG. 14 of the drawings, and for clarity of explanation, the various elements of the preferred embodiment shown in FIG. 14 have been given numbers in the 500 series which correspond to the numbers of similar elements described in connection with FIG. 13. For example, the piston 507, the connecting rod 508, and the hydraulic piston 534 of FIG. 14 correspond to the piston 407, connecting rod 408 and hydraulic piston 434 of FIG. 13, respectively. It will be apparent to those skilled in the art, that the reverse osmosis apparatus of FIG. 14 is constructed to facilitate disassembly and reassembly for maintenance purposes. Cylindrical elements are held in position by axial tension between adjacent flange plates. For example, cylinder 535 is held in position between flange plates 541 and 542 by axial tension on connecting elements 542a, which are connected in between the flange plates 541, 542 by means of screws 543, 544 respectively. Similarly, the cylinder 545 is held in position between flange plates 542, 546 by axial tension on connecting elements 547, which are connected between the flange plates 542, 546 by means of screws 548, 549 respectively. Suitable seals are provided to prevent leakage of fluids between the various chambers of the reverse osmosis apparatus of FIG. 14. For example, the connecting rod 508 slides within ring seals 551, 552 which serve to keep the hydraulic fluid on the side of the hydraulic piston 534 from mixing with the sea water on the side of the pumping piston 507. In addition, the pumping piston 507 is provided with suitable seals 553 for preventing sea water from leaking from the high-pressure to the low-pressure side of that piston 507. Similarly, the hydraulic piston 534 is provided with suitable seals 554 to prevent hydraulic fluid from leaking from the high-pressure side to the low-pressure side of that piston 534.

As shown in FIG. 14 the piston assembly, comprising the pumping piston 507 a connecting rod 508 and a hydraulic piston 534, has fully traveled to its right-most position. The pumping piston 507 rests against the shoulder of a flange 556 and the hydraulic piston 534 has actuated sensing pin 557 which is connected by means not shown to an hydraulic control valve such as the control valve 436 shown in FIG. 13. Actuation of the sensing pin 557 by the hydraulic piston 534 causes the hydraulic control valve to switch the high pressure hydraulic fluid from inlet 538 to inlet 537 causing hydraulic piston 534 to begin to move to the left. Hydraulic fluid to the left of the hydraulic piston 534 drains through port 538.

As the pumping piston 507 begins to move to the left, increased pressure causes the sea water check valve 502 to close, and membrane check valve 513 to open sending sea water under pressure to a reverse osmosis membrane module, such as module 415 shown in FIG. 13. Waste water from the reverse osmosis membrane module 415 is conducted via a shuttle valve (such as the valve 422 in FIG. 13) into conduit 524 to the cylinder outlet chamber 525.

It should be understood for purposes of this invention, that the piston-cylinder arrangement can be substituted for by obvious equivalents, such as a flexible or elastic diaphragm, in a chamber, which are to be considered included within the term, "piston-in-cylinder", or the like.

Figure 15A:
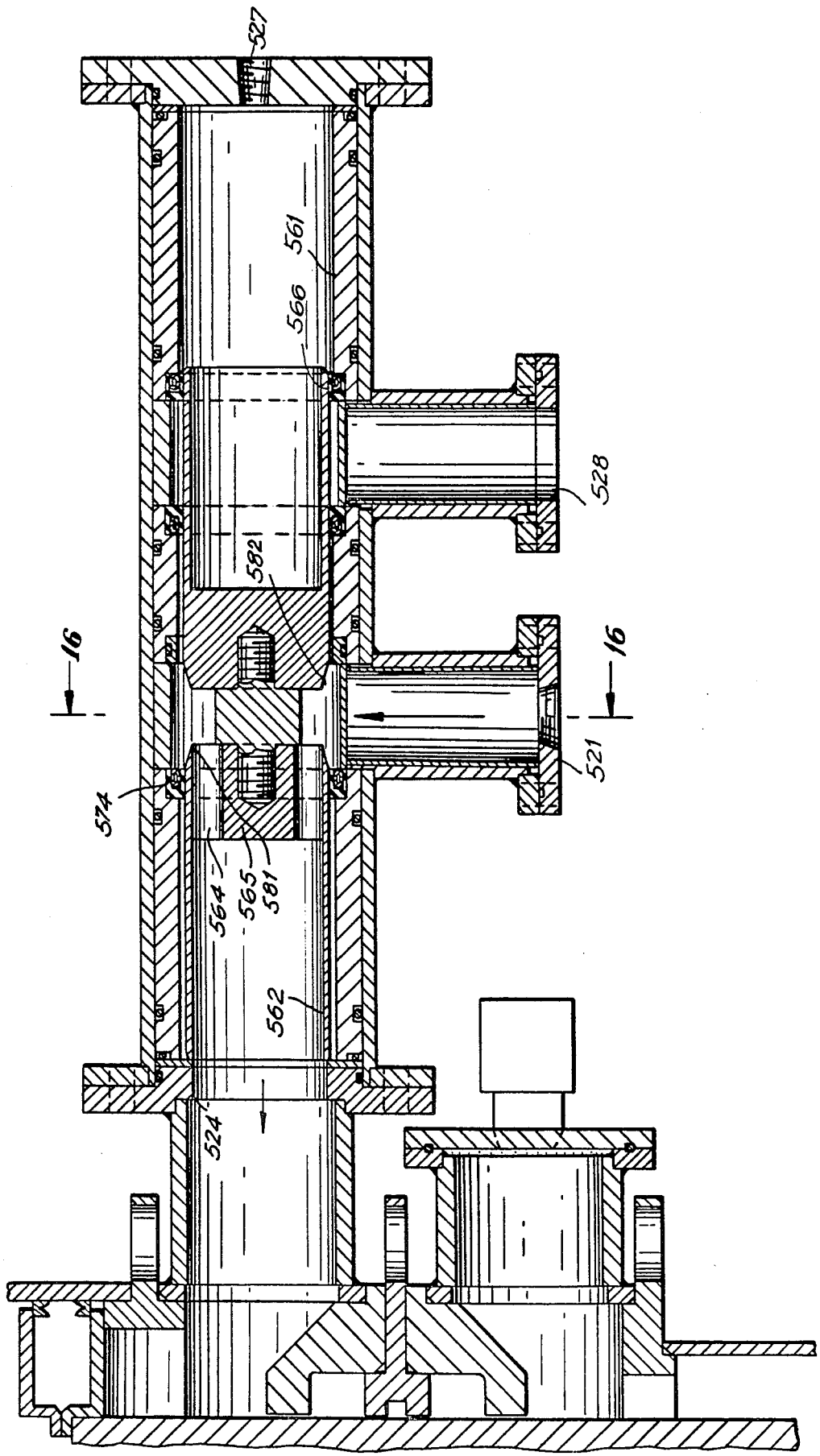
FIGS. 15a and 15b are cross-sectional views of a shuttle valve assembly for the osmosis apparatus of the present invention in different operating positions.
Figure 15B:
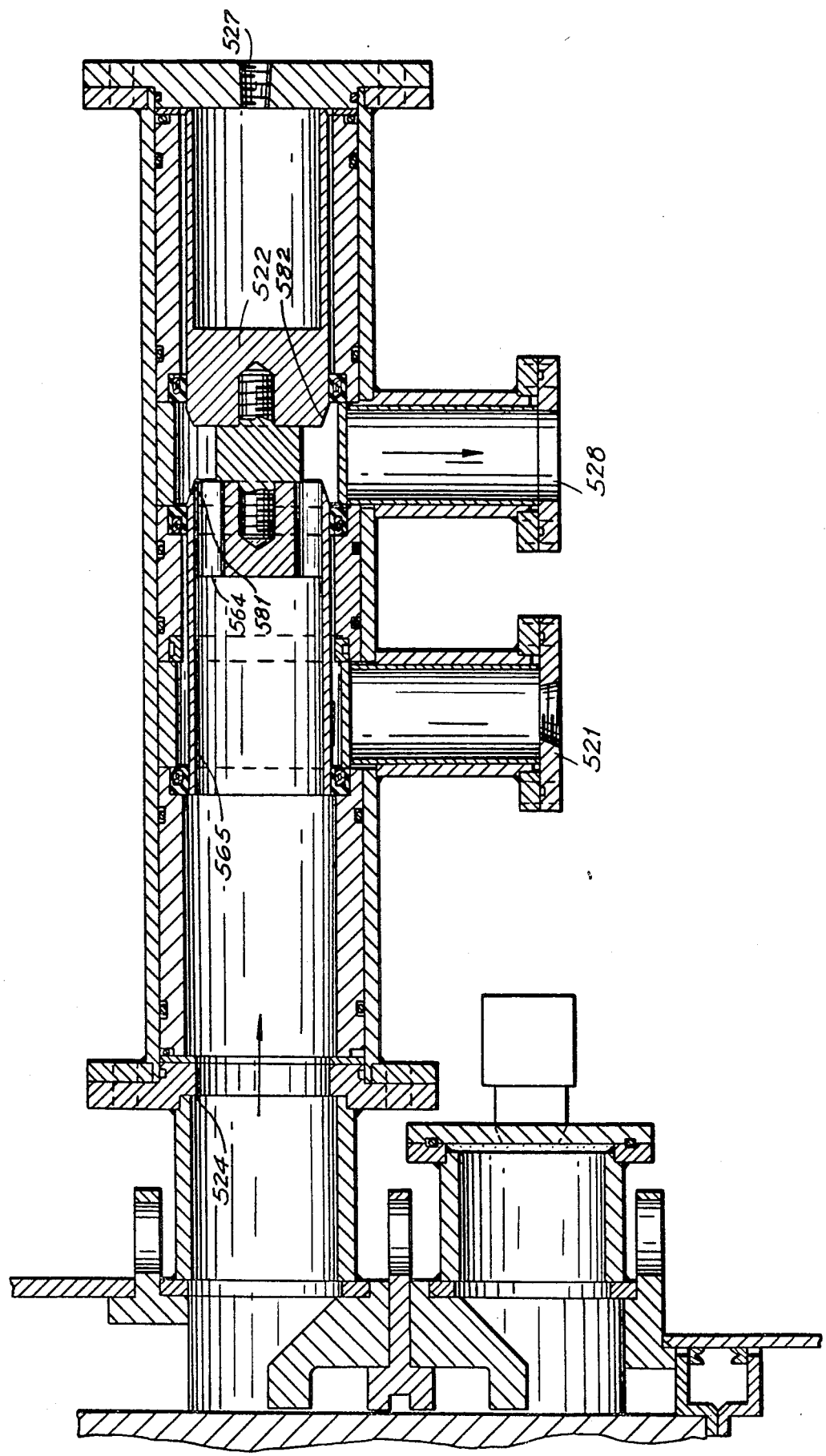

Referring now to FIGS. 15a and 15b of the drawings, the shuttle valve 522 comprises a high pressure cylinder 561 and a free moving shuttle body 562 which fits closely, but is able to move axially, within the cylinder 561 in response to different pressures applied at the ends of the cylinder 561. In FIG. 15a the shuttle body 562 is shown at the left-most extremity of its travel. It is held in this position by the relatively high fluid pressure applied to the shuttle valve port 527. The port 527 is connected by a suitable high pressure tube 527a or conduit to the port 512 which communicates with the intake chamber 505 of the cylinder 506, as shown in FIG. 14.

When the piston 507 moves to the left, pressure in the intake chamber 505 is increased while pressure in the outlet chamber 525 is reduced. The increased pressure in the intake chamber 505 is communicated via a port 512 through a suitable high pressure tube to the shuttle valve port 527 shown in FIG. 15a, while the reduced pressure in the outlet chamber 525 of the cylinder 506 shown in FIG. 14 is communicated via a conduit 524 to the opposite end of the shuttle valve 522 shown in FIG. 15b. During this phase of the operating cycle, waste water from the waste water outlet 419 of the reverse osmosis membrane module is able to flow through the inlet port 521 and thence through axial passages 564 formed in the face of the outlet end 565 of the shuttle body 562 and thence through the conduit 524 to the outlet chamber 525 of the cylinder 506. Flow through drain port 528 is blocked by the solid end 566 of the shuttle 562. The flow of high pressure waste water from the membrane module 415 to the outlet chamber 525 at the rear of the piston 507 helps to move the piston 507 to the left, thus recovering the energy stored in the pressurized waste water, thereby increasing the overall efficiency of operation of the reverse osmosis apparatus.

This phase of the operating cycle continues until the piston 507 causes hydraulic control valve to switch the high pressure hydraulic drive 510. This causes the assembly of the hydraulic piston 534, connecting rod 508, and the piston 507 to begin to move to the right. This increases the pressure in the waste water outlet chamber 525 and decreases the pressure in the sea water inlet chamber 505. The increased pressure is communicated from the outlet chamber 525 through the conduit 524 to the end 565 of the shuttle while the decreased pressure is communicated from the intake chamber 505 through the port 512 and a suitable high pressure conduit to the shuttle valve port 527, as shown in FIG. 15b.

Increased pressure at the left conduit 524 and reduced pressure at the right port 527 causes the shuttle body 562 to move freely to its right most position shown in FIG. 15b. In this position, the outlet end 565 of the shuttle body 562 blocks the flow of waste water through the inlet port 521. At the same time, high pressure waste water from the cylinder outlet chamber 525 is allowed to flow via the conduit 524 and axial passages 564 within the shuttle body 562 to the waste outlet port 528 which is connected to a suitable drain. At the same time that waste water is draining from the outlet port 528, fresh sea water is being drawn in through inlet port 501 and the check valve 502 into the intake chamber 505, shown in FIG. 14. This intake drain phase of operation continues until the hydraulic piston 534 actuates the right sensing pin 557 which causes the hydraulic control valve to switch the high pressure hydraulic fluid from the left port 538 to the right port 537, thus initiating the subsequent sea water pressurization phase of operation described in connection with FIG. 15a.

Figure 16:
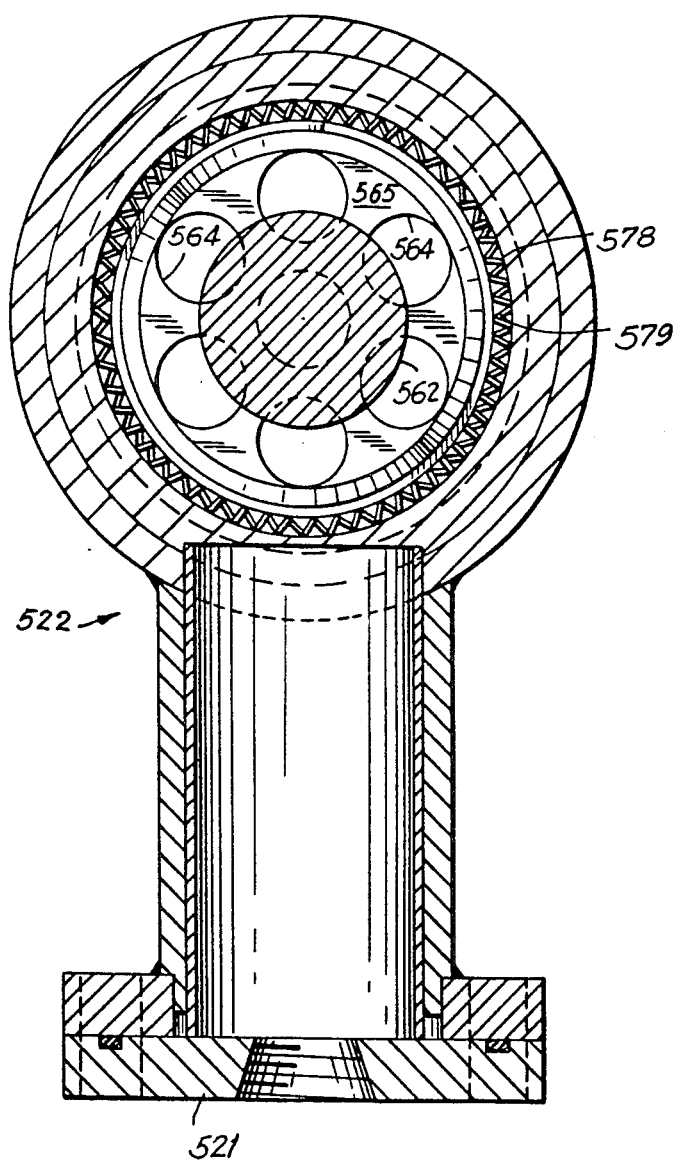

Referring now to FIG. 16, all components of the shuttle valve 522 are made of materials capable of resisting the corrosive effects of sea water under pressure. For example, the intake port 521, the outer cylinder 561 and the shuttle body 562 may be made of stainless steel or other corrosion-resistant metal or other high strength material. In the preferred form of the present invention, the outer stainless steel cylinder 561 is lined with one or more corrosion-resistant sleeves 571 which are made of a material hard enough to resist wear but not so hard so to scratch the stainless steel shuttle body 562. For example, the sleeves 571 may be made of polysulfone or other hard plastic material. In addition, one or more ring seals 574 are provided in insure a fluid-tight seal between the shuttle body 562 and the cylinder liner 571. Ring seals 574 must be of rugged construction to avoid being stripped from their positions by this axial movements of the shuttle body 562.

One type of ring seal which is suitable for use in the shuttle valve 522 of the present invention is the spring-loaded type of ring seal 574, a section of which is shown in detail in FIG. 17. Spiral spring 578 extends around the entire circumference of the seal 574. Spring 578 is surrounded on three sides by sealing material 579 which may be made of a fluorinated hydrocarbon such as Teflon or, more preferably, a fluorinated hydrocarbon (Teflon) loaded with graphite and/or carbon to increase wear resistance. Ring seals of this type are, e.g., manufactured by the Bal Seal Engineering Co., of Santa Anna, California.

Referring again to FIG. 16 of the drawings, a number of axial passages 564 are formed in the face of the outlet end 565 of the shuttle body 562 in order to allow the passage of waste water through the inlet 521 to the pump outlet chamber 525 during the pressurization phase of operation, and from the outlet chamber 525 through the drain 528 during the intake drain phase of operation.

The outer circumferential edge 581 of the outlet end 565 of shuttle body 562 is ground or otherwise formed at an angle of about 15° to the axis of the shuttle body 562. Similarly, the outer circumferential edge 582 of the inlet end 566 of the shuttle body 562 is likewise ground or formed at an angle of 15° in order to facilitate the movement of the edges 581 and 582 past ring seals 574 during operation of the shuttle valve 522. The angle of 15° has been found to be most suitable for the smooth functioning of the shuttle valve 522. Greater angles (30°, for example) tend to increase wear and increase the probability that the ring seals 574 will be stripped from their positions by the forceful motions of shuttle body 562.

Figure 18:
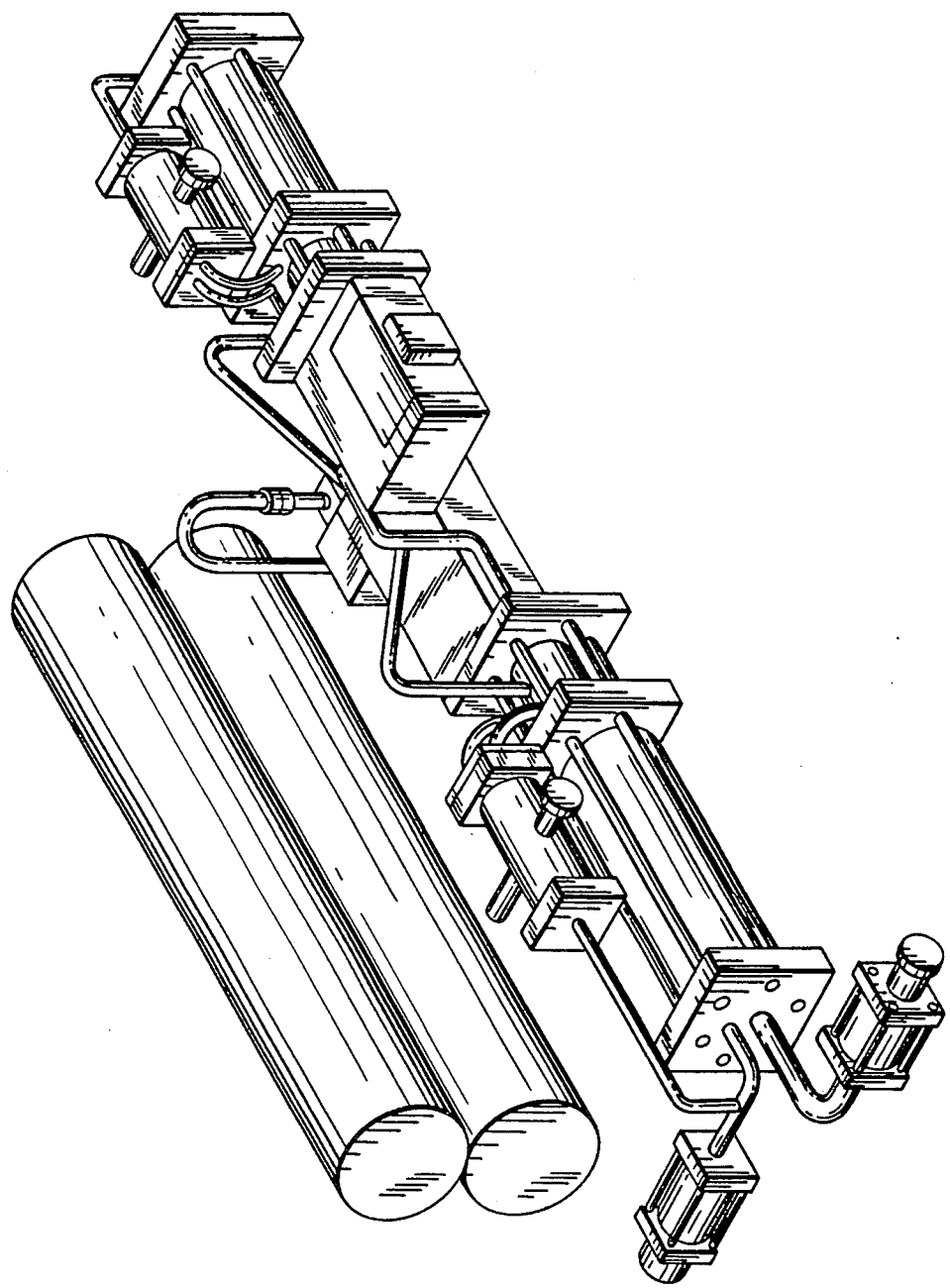
FIG. 18 is an isometric view showing two reverse osmosis apparatus of this invention and a hydraulic drive means.

It will be appreciated by those skilled in the art that the operation of the reverse osmosis pump shown in FIG. 14 requires more hydraulic force during the sea water pressurization phase of its operation than is required during the intake-drain phase of operation. Hydraulic drive forces can be equalized by driving two reverse osmosis pumps from the same hydraulic drive piston. This can be conveniently accomplished (as shown in FIG. 18) by mounting a reverse osmosis pump at each end of a single hydraulic drive piston. The two reverse osmosis pumps would be arranged so that, on one stroke of operation, the first reverse osmosis pump would be in the intake drain phase. On the reverse stroke of operation, the first reverse osmosis pump would be in the intake drain phase while the second pump would be in the pressurization phase. The forces on the hydraulic drive piston would thus be equalized with resulting improvement in the overall efficiency of operation.

WIND GENERATED ENERGY

In describing the wind-powered electric generator of the present invention, an example which is designed to extract the maximum energy from the wind and to operate most efficiently at wind speeds in the neighborhood of 12 m.p.h. is presented. It will be appreciated, however, that the design of the present wind generator can be optimized for a higher or lower wind velocities in order to take maximum advantage of the wind energy profile at a particular location.

Figure 19:
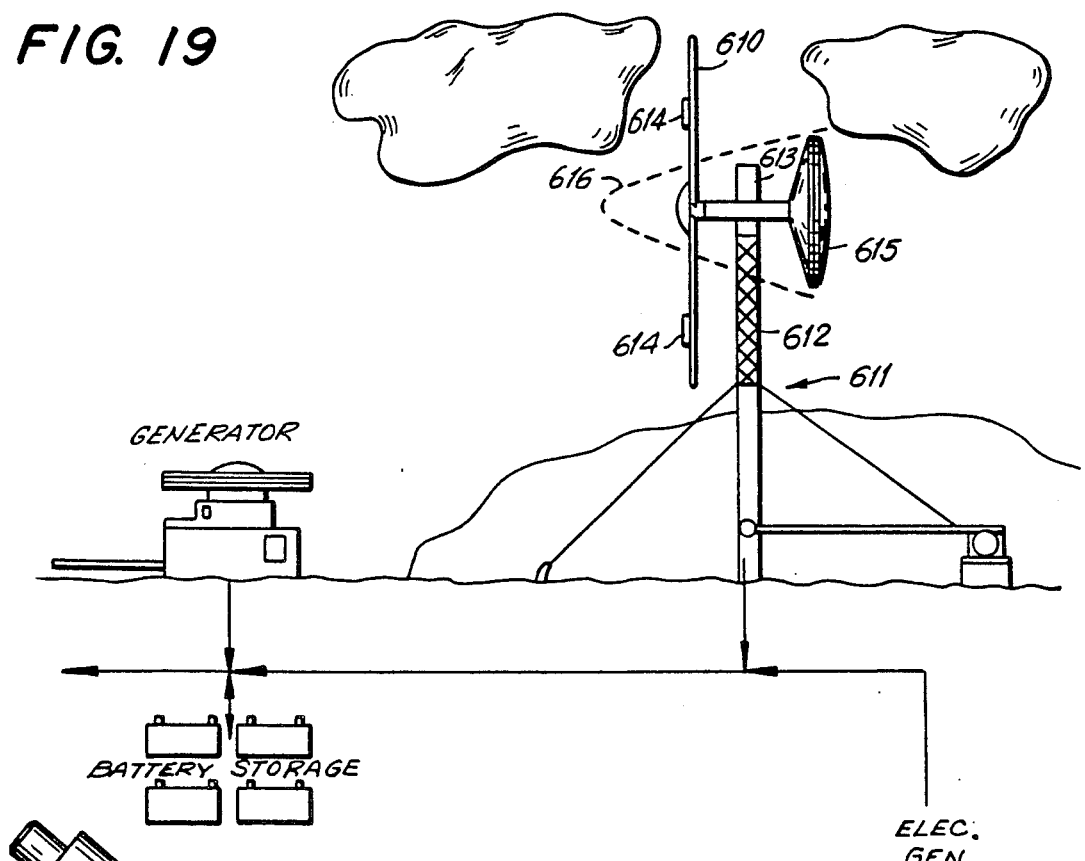
FIG. 19 is a diagrammatic elevation view of the wind-powered generator of this invention.

Referring to FIG. 19 of the drawings, the preferred form of wind generator according to the present invention comprises a large, two-bladed propeller 610 mounted on a tower 611 of suitable height. For example, the propeller 610 may be twenty-two feet in diameter and the tower 611 may be thirty feet high. It will be appreciated, however, that the propeller and tower may be larger or smaller and that a propeller having three or more blades can be used within the spirit and scope of the present invention. The upper portion 612 of the tower 611 is preferably of open lattice construction to prevent the formation of a high pressure region or "spike" along its leading edge. Such a pressure spike, if formed, could interfere with the smooth swinging of the propeller blades 610 and set up dangerous vibrations which could damage the structure of the propeller blades 610 or tower 611.

The propeller shaft is connected directly to the rotor of a large diameter electric generator 615 mounted behind the disk swept by the propeller blades 610. In the preferred form of the present invention, the generator 615 is approximately ten feet in diameter and is designed to produce a 1KWH output at a wind speed of 12 m.p.h. A large diameter rotor preferably equal to at least about 30% of the diameter of the propeller, and most preferably 40% to at least, but not greater than the propeller diameter, is needed to increase the velocity speed at which the generator windings cut magnetic field lines so as to produce a suitably high electromotive force (emf), because the rotor of the generator 615 is directly driven by the shaft of the propeller 610. The large diameter is needed in order to avoid efficiency losses associated with speed-increasing transmission mechanisms. An unexpected benefit of the large diameter electric generator 615 is that it creates a pressure spike, indicated by dashed lines 616, which acts as a nose cone and serves to accelerate the wind past the propeller blades 610, thus increasing their efficiency.

The propeller/generator head, 613, or alternatively, the entire tower 611, is steerable in azimuth under control of wind velocity and direction sensing devices, not shown. At low velocities, the propeller 610 is pointed directly into the wind in order to take maximum advantage of the available wind power. At high wind velocities, the propeller 610 is pointed at an angle to the wind in order to prevent the propeller 610 from reaching excessive speeds which might damage the mechanism. In addition, the propeller 610 is provided with either variable pitch blades or spoiler mechanisms 614 in order to prevent runaway propeller speeds at reasonably high wind velocities. These speed control devices are preferably designed to operate in a fail-safe, manner as will be described in greater detail hereinafter.

Referring to FIG. 20 of the drawings, in the preferred form of propeller airfoil, generally, the inner sections of the propeller airfoil correspond to the low-speed "Clark y" airfoil design, while the outer sections of the propeller airfoil correspond to the higher speed "Eppler" airfoil design. Sub-FIGS. 20a to 20h show cross-sections taken every foot along the length of the preferred eleven foot propeller airfoil. The following is a table showing the radial distance of each section from the propeller hub, angle of attack, and chord of each section:

| FIG. | RADIUS | ANGLE OF ATTACK | CHORD |
| --- | --- | --- | --- |
| a | 2 ft. | 26° | 16" |
| a | 3 ft. | 19° | 16" |
| b | 4 ft. | 16.5° | 15" |
| c | 5 ft. | 12.5° | 13.5" |
| d | 6 ft. | 10.5° | 13" |
| d | 7 ft. | 9.0° | 13" |
| e | 8 ft. | 8.0° | 12.5" |
| f | 9 ft. | 7.0° | 12" |

-continued

| FIG. | RADIUS | ANGLE OF ATTACK | CHORD |
| --- | --- | --- | --- |
| g | 10 ft. | 6.5° | 11.5" |
| h | 11 ft. | 6.0° | 11" |

Generally, the preferred form of propeller airfoil is designed so that the tangential velocity of the propeller tips preferably is equal to from about six to seven times and most preferably about 6.5 times the wind velocity. For example, at a wind speed of 12 m.p.h., the tips of the eleven foot long propeller blades are designed to move at about 78 m.p.h. which translates to a rotational speed of about 100 r.p.m. It has been found that a tip speed ratio of about 6.5 enables the wind generator of the present invention to extract the maximum energy from the wind.

Figure 21A:
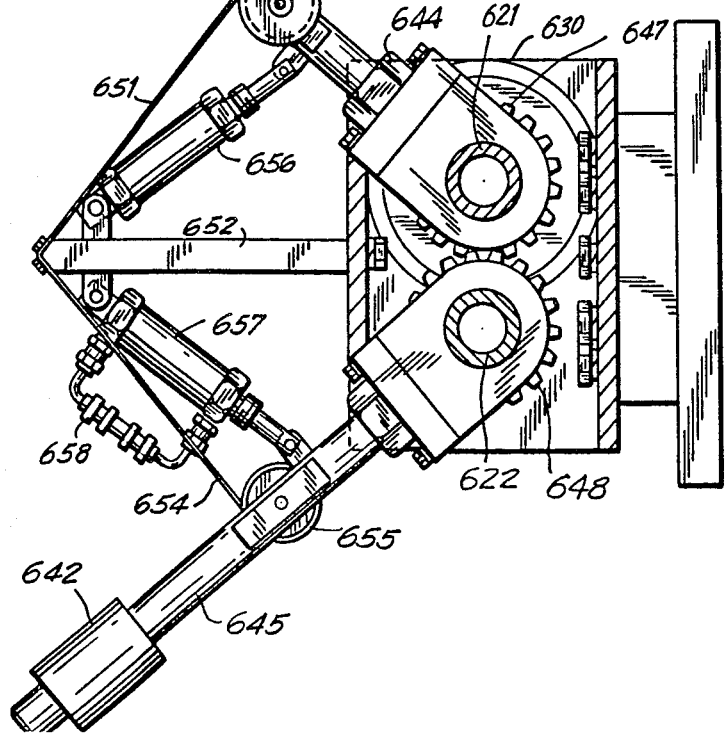
FIG. 21a is a cross-section of the propeller hub assembly taken along lines A—A of FIG. 21.
Figure 20A:
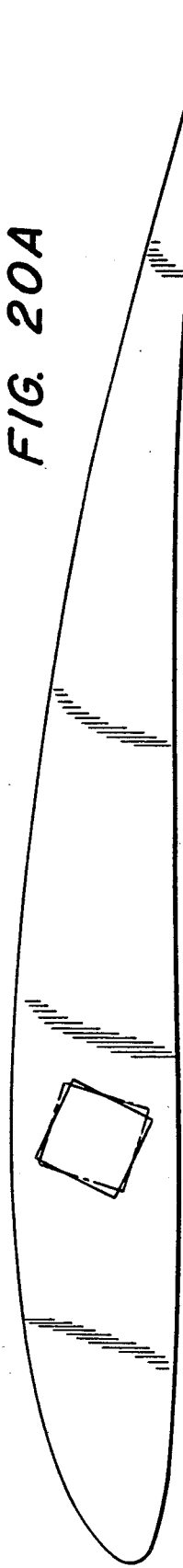
FIG. 20 shows several successive cross-sections of a preferred airfoil or propeller, useful in the wind-powered generator of this invention.
Figure 20B:
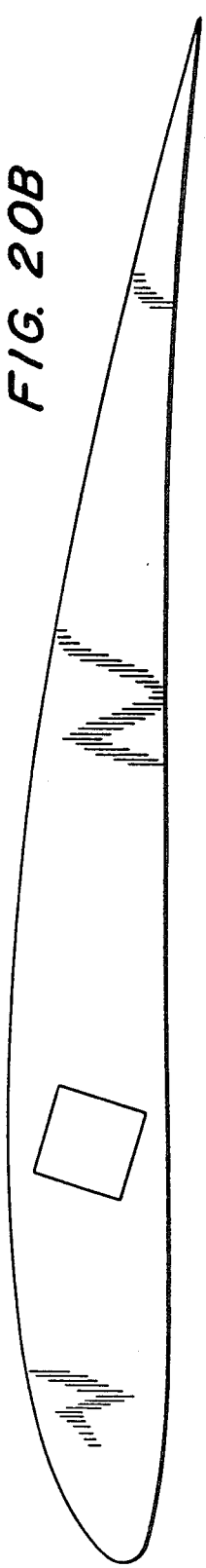
Figure 20C:
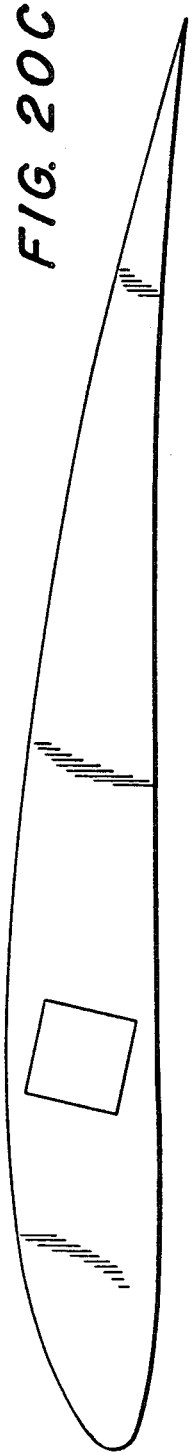
Figure 20D:
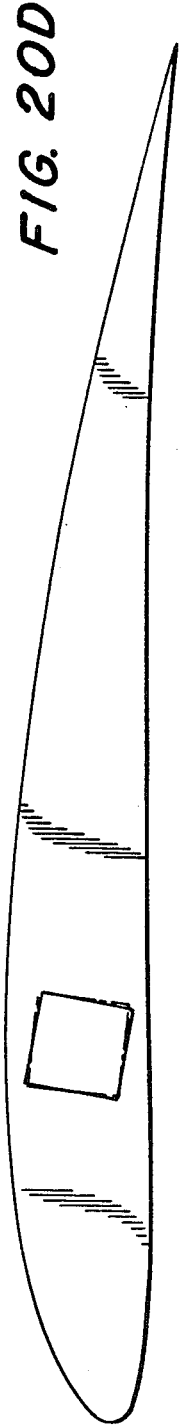
Figure 20E:
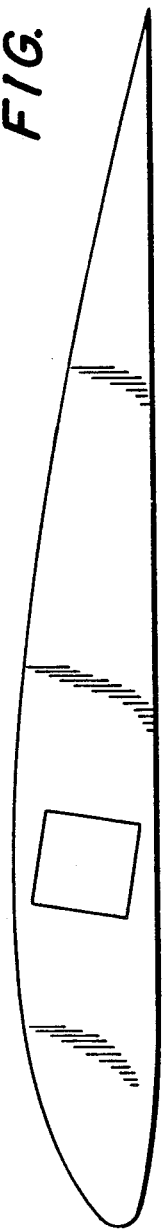
Figure 20F:
Figure 20G:
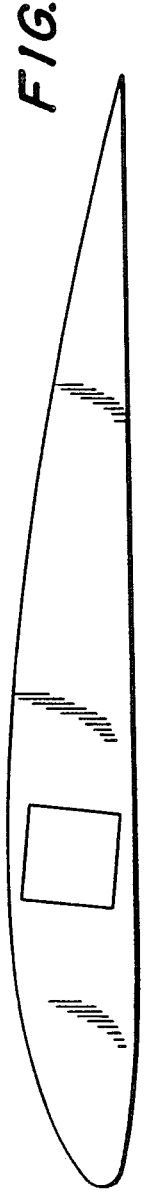
Figure 20H:
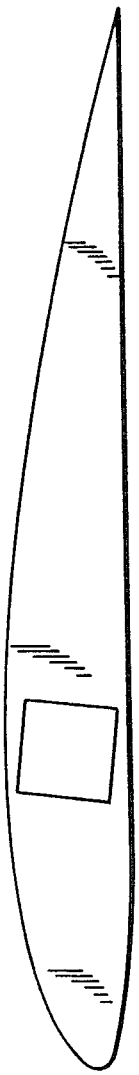
Figure 21:
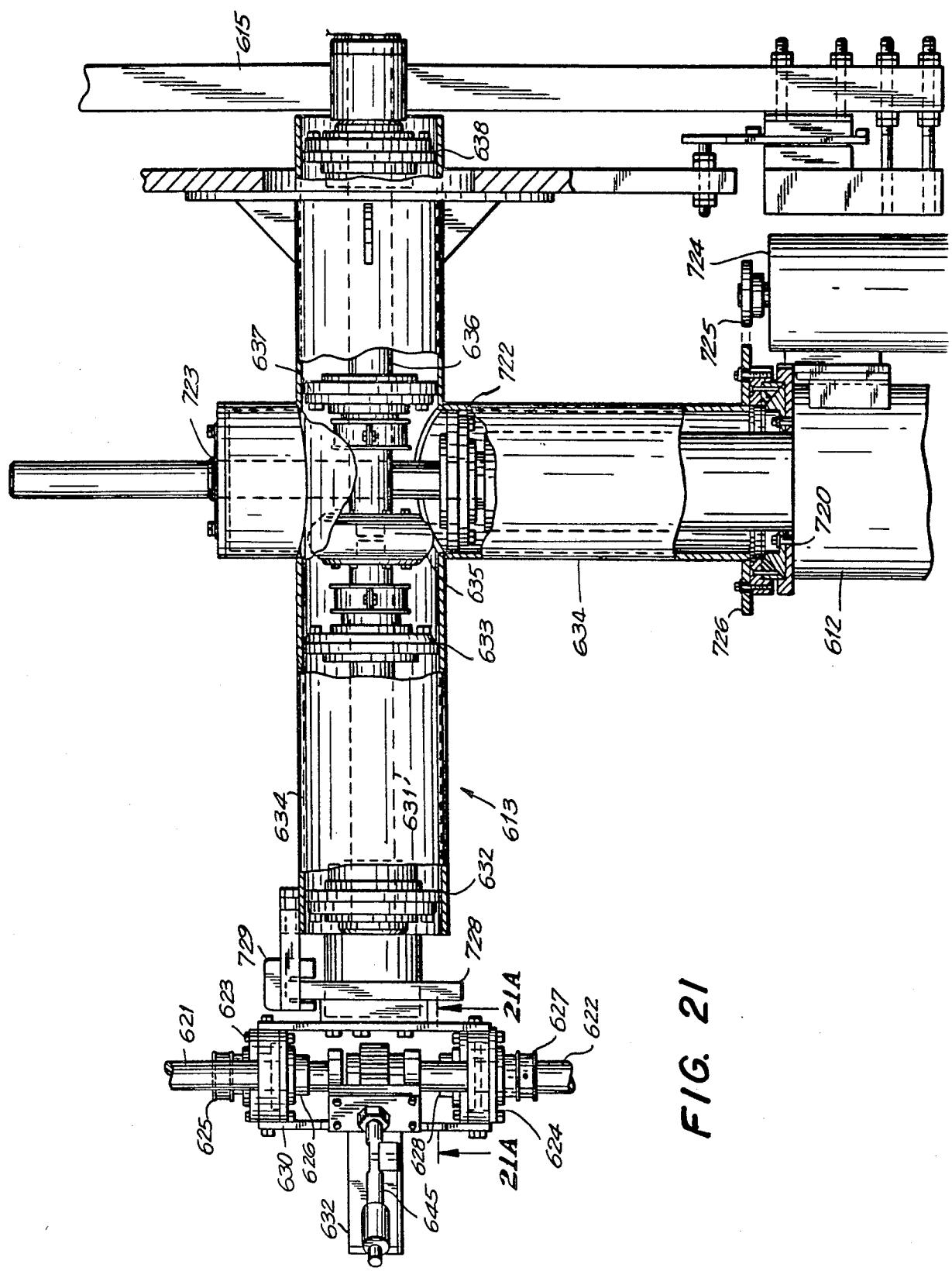
FIG. 21 is a detailed cross-sectional diagram of the propeller/generator head.

Referring now to FIG. 21 of the drawings, propeller airfoils, not shown, are rigidly mounted on the cylindrical propeller spars 621, 622 which are rotatably mounted within bearing sleeve assemblies 623, 624 respectively. The propeller spar 621 is prevented from sliding axially within the sleeve 623 by collars 625, 626, and the propeller spar 622 is prevented from sliding axially within the sleeve 624 by collars 627, 628. Bearing sleeves 623, 624 are mounted on a propeller hub assembly 630 which is in turn mounted on the end of a propeller shaft 631, which is journalled within low-friction bearings 632, 633 mounted within the housing 634 which is preferably of welded steel construction. The propeller shaft 631 is connected by a rubber bushing 635 to a generator shaft 636 which is journalled within low-friction bearings 637, 638 mounted within the housing 634. A rubber bushing 635 serves to absorb torsional shocks caused by abrupt variations in wind speed.

Referring now to FIG. 21a of the drawings, there is shown a preferred embodiment of the speed control mechanism that acts to feather the propeller 610 when its rotational speed becomes too great. More specifically, the speed control mechanism comprises a pair of weights 641, 642 which are urged to move radially outward by the centrifugal force of rotation of the propeller hub 630. The weight 641 is adjustably mounted on a bar 643 which is, in turn, mounted on a collar 644 which is, in turn, securely fixed to the propeller spar 621. The weight 642 is adjustably mounted on a bar 645 which is securely fixed to the propeller spar 622. When the rotational speed of the propeller hub 630 becomes excessive, centrifugal force causes the weights 641, 642 to swing outward causing the spars 621, 622 to rotate in opposite directions so as to feather the propeller airfoils and thus reduce propeller speed. The contra-rotation of the spars 621, 622 is synchronized by the meshing of a gear 647, mounted on the spar 621, with a gear 648 mounted on the spar 622.

The weight 641 is restrained from swinging outward by a steel tape 651 stretched between a center post 652 of the hub assembly 630 and the tension reel 653 mounted on the bar 643. Similarly the weight 642 is restrained from swinging outward by the steel tape 654 stretched between the center post 652 and the bar 645. The desired relationship between propeller rotational speed and airfoil feathering is achieved by adjusting the tensions of the tension reels 653, 655 and by adjusting the positions of the weights 641, 642 along the bars 643, 645 respectively.

The speed of outward and inward motion of the governor weights 641, 642 is controlled by a hydraulic damping cylinder 656 connected between the bar 643 and the centerpost 652, and by a second hydraulic damping cylinder 657 connected between the bar 645 and the centerpost 652. The hydraulic cylinders 656, 657 may be provided with adjustable orifice elements, such as the elements 658 associated with the cylinder 657, in order to permit adjustment of the damping effect.

In addition, the propeller shaft 631 is provided with a brake disk 728, and a corresponding brake caliper mechanism 729 is mounted on the housing 634 to allow the propeller to be brought to a full standstill if desired.

It will be appreciated by those skilled in the art that other forms of speed control mechanisms can be used in conjunction with the subject wind generator. For example, FIGS. 22-24 show in schematic form, another form of speed control system within the scope of the present invention. FIG. 22 shows propeller airfoils 61, 662 fixedly mounted on a hub 660 which is mounted on the propeller shaft 631, which is journalled within the housing 634, as described in connection with FIG. 21. One or more indicia 663 are mounted on the stationary housing 634 and at least one sensing device 664 is mounted on the rotating propeller hug 660 so that the rate at which the indicia 663 sweep past the sensing device 664 provides a measurement of the rotational speed of the propeller hub 660.

Mounted within the hub 660 is an electronic comparator circuit 665 shown in Block diagram form in FIG. 23. A comparator circuit 665 compares the output from the sensing device 664 with the output from an electronic clock 666 which can be preset to a rate corresponding to the maximum desired rotational speed of propeller hub 660. When the output rate from the sensor 664 exceeds the preset rate from the clock 666, the comparator 6ysignals actuators 667 and 668 to raise suitable spoilers on the airfoils 661, 662, thus increasing their drag and reducing their speed. When the output rate from the speed sensor 664 drops to below the preset rate from the clock 666, comparator 665 signals the actuators 667, 668 to retract the spoilers so that the airfoils 661, 662 can again operate at full efficiency.

The power for the speed sensor 664, or comparator circuit 665, clock 666, and actuators 667, 668, is provided by a rechargeable battery 671. A battery 671 can be charged by a generator 672 which includes suitable rectifier circuits in combination with generator coils 673 mounted on the hub 660 as shown in FIG. 22. Generator coils 673 are energized by permanent magnets 674 which are mounted on the rear surface of the generator propeller hub 675, so that they sweep in close proximity to the coils 673. The generator propeller hub 675 spins freely on a shaft 676, mounted on the main propeller hub 660, the generator propeller blades 677, 678 are preferably arranged to spin in the opposite direction from main airfoils 661, 662, to assure maximum relative speed between the generator coils 673 and permanent magnets 674.

FIG. 24a shows a "fence" type of spoiler 681, which can be raised about two inches from the surface of an airfoil 682, as shown, in order to increase the drag and thus reduce the speed of the airfoil 682. Alternatively, the spoiler 681 can be retracted into a slot 683, so that the airfoil 682 can operate at full efficiency. In the preferred form of the present invention, the spoiler 681 extends about two feet along the length of the airfoil 682 and is preferably located about two thirds of the distance from the hub to the tip of the airfoil 682.

FIG. 24b shows a "flap" type spoiler 684 that can be rotated up to the position shown to increase the drag and reduce the speed of an airfoil 685. Alternatively, the spoiler 684 can be rotated downward to lie flush with the surface of the airfoil 685, so that the airfoil 685 can operate at full efficiency.

Referring again to FIG. 21, the generator shaft 636 is connected to the rotor 690 of the subject wind generator. In the preferred form of the present invention, the rotor 690 is about ten feet in diameter carries a plurality of pairs of permanent field magnets, such as permanent magnets 691, 692, which are about six inches long in the radial direction and two inches wide in the circumferential direction, and are mounted at approximately four inches on centers around the entire circumference of the rotor 690. More specifically, the magnets 691 are mounted on a steel supporting plate 693 while the other magnets 692 are mounted on a steel supporting plate 694. The first supporting plate 693 is adjustably mounted on the rotor 690 by means of bolts 695 and the second supporting plate 694 is adjustably mounted on the rotor 690 by means of bolts 696. Bolts 695 and 696 allow the positions of the supporting plates 693, 694 to be carefully adjusted to provide the narrowest practical gap between the permanent magnets 691, 692 so as to provide the maximum magnetic flux density.

The permanent field magnets 691, 692 carried by the wind driven rotor 690 sweep past both sides of generator windings embedded within a stator ring 700 which is preferably made of epoxy or other suitable non-magnetic material. Non-magnetic material is used in order to avoid hysteresis losses and thus provide the highest possible conversion efficiency from windpower into usable electric power. The stator ring 700 is adjustably mounted by means of bolts 701 to support members 702 extending from the housing 634 of the wind generator. Bolts 701 allow the position of the stator ring 700 to be carefully adjusted within the gap between the field magnets 691, 692.

Referring to FIG. 25 of the drawings, permanent magnets 691, 692 are arranged so that, for example, the south pole of one magnet 691a faces the north pole of a second magnet 692a, the north pole of the next first magnet 691b faces the south pole of the next second magnet 692b, the south pole of the third first magnet 691c faces the north pole of third second magnet 692c and so on around the entire circumference of the rotor 690 shown in FIG. 21. A steel supporting plate 693 provides flux paths between adjacent oppositely poled magnets 691 while a steel supporting plate 694 provides flux paths between adjacent oppositely poled magnets 692.

In a preferred form of the present invention, a stator ring 700 had imbedded within it three sets of generator windings 704, 705 and 706 arranged in phased relationship so that each winding successively is simultaneously swept by all pairs of the field magnets 691, 692. For example, as shown in FIG. 25. The winding 706 is simultaneously swept by all pairs of the field magnets 691, 692. Assuming that the field magnets 691, 692 are sweeping from right to left, they will next sweep a first winding 705, then a second winding 706 etc.

Referring to FIG. 26, the windings 704, 705, 706 all within the stator ring 700. The radial sections of the windings 704, 705, 706 lie within the gap between the field magnets 691, 692, shown in FIGS. 21 and 25, while the circumferential sections of the windings 704, 705, 706 preferably lie outside the gap in the portions 708, 709 of the stator 700.

Referring to FIG. 27 of the drawings, in the preferred form of electric circuit for converting the electric power generated at the wind generator into usable form, the output from each generator winding 704, 705, 706 is applied to full wave rectifier circuits 712, 713, 714 respectively, and the outputs from the rectifier circuits 712, 713, 714 are connected to batteries 716, 717, 718, respectively. This arrangement provides for pulse charging of the batteries to a level of 12 volts according to the preferred embodiment of the present invention. The batteries 716, 717, 718 can be connected in series to provide increased output voltage across a load 719.

Referring again to FIG. 21 of the drawings, the entire propeller/generator head 613 of the subject wind generator is rotatably mounted on the supporting tower 611 by means of a thrust bearing 720 mounted on top of the tower 611. A reduced diameter shaft extends upward from the tower 611 through bearings 722 mounted within the housing 634 and the bearing 723 at the top of the housing 634 to stabilize the propeller/generator head with respect to the tower 611. It will be appreciated, moreover, that the lengths of the propeller arm and generator arm of the housing 634 are so proportioned that the weight of the propeller assembly and the weight of the generator assembly are nicely balanced atop the tower 611.

A steering motor 724 is mounted at the top of the tower 611 so that its drive gear 725 engages the gear wheel 726 surrounding the base of the housing 634. Operation of the steering motor 724 allows the entire propeller/generator head 613 to be steered into or away from the wind as described above in connection with FIG. 19.

The patentable embodiments of this invention which are claimed are as following:

1. In a process for preparing methanol and an active metal oxide, the process comprising calcining an alkaline earth metal carbonate at elevated temperatures to form the alkaline earth metal oxide and carbon dioxide, admixing the carbon dioxide with a flow of hydrogen gas at a molar ratio of $H_2:CO_2$ of at least about 3:1 and reacting the $H_2$ and $CO_2$ at elevated temperatures, to form a gaseous shift reaction mixture comprising hydrogen, carbon dioxide and carbon monoxide and water vapor; condensing out any water from the gaseous shift reaction mixture to form a synthesis gas mixture having an average molecular weight for methanol synthesis; compressing the substantially water-free synthesis gas mixture to a total pressure of at least about 500 psig and pre-heating to a temperature of at least about 200° F.; and passing the pressurized and preheated water-free shift reaction mixture over a catalyst to form a product mixture comprising methanol and water; the improvement which comprises continuously monitoring the relative proportions of hydrogen gas to carbon dioxide and carbon monoxide in the synthesis gas mixture by a process comprising continuously collecting and measuring the amount of water condensed from the gaseous shift reaction mixture, to determine the amount of hydrogen which reacted with carbon dioxide to form water and carbon monoxide, and controlling the rate of the flow of hydrogen to be admixed with the carbon dioxide to maintain an average molecular weight for the synthesis gas mixture.

2. The process of claim 1 wherein the product mixture further comprises unreacted hydrogen, carbon dioxide and carbon monoxide, and the process comprising in addition separating out the methanol and water from the product mixture to form a gaseous recycle mixture comprising hydrogen, carbon dioxide and carbon monoxide, and admixing the recycle mixture with additional carbon dioxide and hydrogen to form synthesis gas mixture, and directly monitoring the average molecular weight of the recycle mixture by passing a known sample of the gaseous recycle mixture through an accurately machined orifice at sonic velocity into a tank containing an inert liquid, measuring the time to displace a known volume of the inert liquid, and thereby determining the average molecular weight of the recycle gas in order to determine the relative flow of additional hydrogen and carbon dioxide required to form the recycled synthesis gas mixture.

3. In a process for preparing methanol, the process comprising admixing and reacting carbon dioxide with hydrogen gas at a molar ratio of $H_2:CO_2$ of at least about 3:1 at elevated temperatures, to form a gaseous shift reaction mixture comprising hydrogen, carbon dioxide and carbon monoxide and water vapor; removing the water to form a substantially water-free synthesis gas mixture; compressing the water-free synthesis gas mixture to a total pressure of at least about 500 psig and pre-heating to a temperature of at least about 200° F., passing the pressurized and preheated gaseous mixture over a catalyst to form methanol and water; the improvement which comprises passing a sample of the water-free synthesis gas mixture of known temperature and pressure, through an accurately machined orifice at sonic velocity into a tank containing an inert liquid and measuring the time to displace a known volume of liquid, in order to monitor the "average" molecular weight of the synthesis gas mixture and controlling the relative flow of hydrogen gas and carbon dioxide in response thereto.

4. In a process for preparing methanol, the process comprising reacting carbon dioxide, carbon monoxide and hydrogen gas at a molar ratio of $H_2:CO_2+CO$ of at least about 3:1 at elevated temperatures and pressures to form methanol, the improvement comprising forming a gaseous mixture of hydrogen and carbon dioxide and less that about 1.0% by volume carbon monoxide and compressing the gas mixture to a total pressure of at least about 500 psig and heating to a temperature of at least about 450° F., to form a first reaction mixture comprising more than about 1.5% by volume of carbon monoxide, and immediately contacting the first reaction mixture with a copper-nickel catalyst to form methanol and water.

5. The process of claim 4, wherein the gaseous mixture is reacted in a multiple tube reactor, the tubes being arranged in parallel and the initial at least about 25 percent of the length of each tube, is free from catalyst and the remaining portion containing the nickel-copper catalyst.

6. The process of claim 5, wherein the molar ratio of $H_2:CO_2+CO$ is in the range of from about 3:1 to about 5:1.

* * * * *